(12) United States Patent
Bobert et al.

(10) Patent No.: US 12,131,453 B2
(45) Date of Patent: *Oct. 29, 2024

(54) SYSTEMS AND METHODS FOR ARTIFICIAL INTELLIGENCE (AI) ERGONOMIC POSITIONING

(71) Applicant: The Travelers Indemnity Company, Hartford, CT (US)

(72) Inventors: Tyler S. Bobert, Afton, MN (US); Christian P. Grant, St. Paul, MN (US); Matthew M. Hafele, East Hampton, CT (US); Nadia H. Magnuson, St. Paul, MN (US); Richard N. Marsh, Hartford, CT (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,183

(22) Filed: Jun. 1, 2023

(65) Prior Publication Data
US 2023/0306574 A1 Sep. 28, 2023

Related U.S. Application Data

(63) Continuation of application No. 17/490,295, filed on Sep. 30, 2021, now Pat. No. 11,704,784.

(51) Int. Cl.
G06T 7/00 (2017.01)
G06F 3/01 (2006.01)
(Continued)

(52) U.S. Cl.
CPC ............ *G06T 7/0002* (2013.01); *G06F 3/011* (2013.01); *G06F 3/016* (2013.01); *G06F 18/24* (2023.01);
(Continued)

(58) Field of Classification Search
CPC .......... G06T 7/0002; G06T 7/73; G06T 7/20; G06T 11/00; G06T 2207/10024; G06T 2207/10028; G06V 20/00; G06F 3/011; G06F 3/016; G06K 9/626; G06K 9/6267; G06N 5/04; G06Q 10/0635
See application file for complete search history.

(56) References Cited

U.S. PATENT DOCUMENTS 6,931,387 B1 * 8/2005 Wong ..................... G06Q 10/04
706/50
11,127,131 B1 * 9/2021 Thomas ................... G06T 7/60
(Continued)

OTHER PUBLICATIONS

Office Action for U.S. Appl. No. 17/490,295 dated Oct. 26, 2022; 27 pps.
(Continued)

*Primary Examiner* — Yu Chen
(74) *Attorney, Agent, or Firm* — Rowan Tree Law Group, PLLC; Carson C. K. Fincham

(57) ABSTRACT

An Artificial Intelligence (AI) ergonomic assessment and positioning system that analyzes remote workspace data, identifies objects that are improperly positioned, oriented, and/or have undesirable settings, and automatically adjusts, moves, sets, and/or provides automatic guidance for the adjustment, movement, and/or setting of target objects in the remote workspace.

20 Claims, 13 Drawing Sheets

(51) Int. Cl.

| | |
|---|---|
| *G06F 18/24* | (2023.01) |
| *G06N 5/04* | (2023.01) |
| *G06Q 10/0635* | (2023.01) |
| *G06T 7/20* | (2017.01) |
| *G06T 7/73* | (2017.01) |
| *G06T 11/00* | (2006.01) |
| *G06V 20/52* | (2022.01) |

(52) U.S. Cl.
CPC ......... *G06F 18/24765* (2023.01); *G06N 5/04* (2013.01); *G06Q 10/0635* (2013.01); *G06T 7/20* (2013.01); *G06T 7/73* (2017.01); *G06T 11/00* (2013.01); *G06V 20/52* (2022.01); *G06T 2207/10024* (2013.01); *G06T 2207/10028* (2013.01)

(56) References Cited

U.S. PATENT DOCUMENTS

| | | | | |
|---|---|---|---|---|
| 2016/0070958 | A1* | 3/2016 | Whelan | G06T 7/70 382/107 |
| 2016/0260019 | A1* | 9/2016 | Riquelme Ruiz | G06N 20/00 |
| 2018/0352959 | A1* | 12/2018 | Zhang | A47C 1/03 |
| 2020/0273580 | A1* | 8/2020 | Kaszuba | G06F 18/251 |
| 2021/0232810 | A1* | 7/2021 | Parsa | G06N 3/08 |
| 2022/0079510 | A1* | 3/2022 | Robillard | G06V 40/103 |
| 2022/0084236 | A1* | 3/2022 | Send | G06T 7/521 |
| 2022/0238034 | A1* | 7/2022 | Bryan | G16H 50/30 |

OTHER PUBLICATIONS

Notice of Allowance for U.S. Appl. No. 17/490,295 dated Apr. 5, 2023; 10 pps.

Dimitropoulos, Nikos et al. "Seamless human-robot collaborative assembly using artificial intelligence and wearable devices." Applied Sciences 11.12 (2021): 5699. (Year: 2021); 11 pps.

Trifonova, Teodora et al. "Smart sensor network for ergonomic evaluation of working enviroment." ICEST 2013 (2013): 371-3; 5 pps.

* cited by examiner

SYSTEMS AND METHODS FOR ARTIFICIAL INTELLIGENCE (AI) ERGONOMIC POSITIONING

CROSS-REFERENCE TO RELATED APPLICATIONS

Benefit and priority under 35 U.S.C. § 120 is hereby claimed to, and this is a Continuation of, U.S. patent application Ser. No. 17/490,295 filed on Sep. 30, 2021 and titled "SYSTEMS AND METHODS FOR ARTIFICIAL INTELLIGENCE (AI) ERGONOMIC POSITIONING", which issued as U.S. Pat. No. 11,704,784 on Jul. 18, 2023 and which is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The science and utilization of ergonomics have become common factors in many workplaces, with specially designed ergonomic office chairs, foot rests, wrist rests, and stand-up or multi-level desks being incorporated into many workspaces in a variety of industries. Ergonomic designs and workspace assessments are often utilized by businesses to ensure that their workforce is provided with an environment that reduces the likelihood of injury, strain, and/or stress. In distributed workforce environments, such as have become increasingly common due to the COVID-19 pandemic, such assessments and designs have become increasingly difficult to implement.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

I. Introduction

Figure 1:
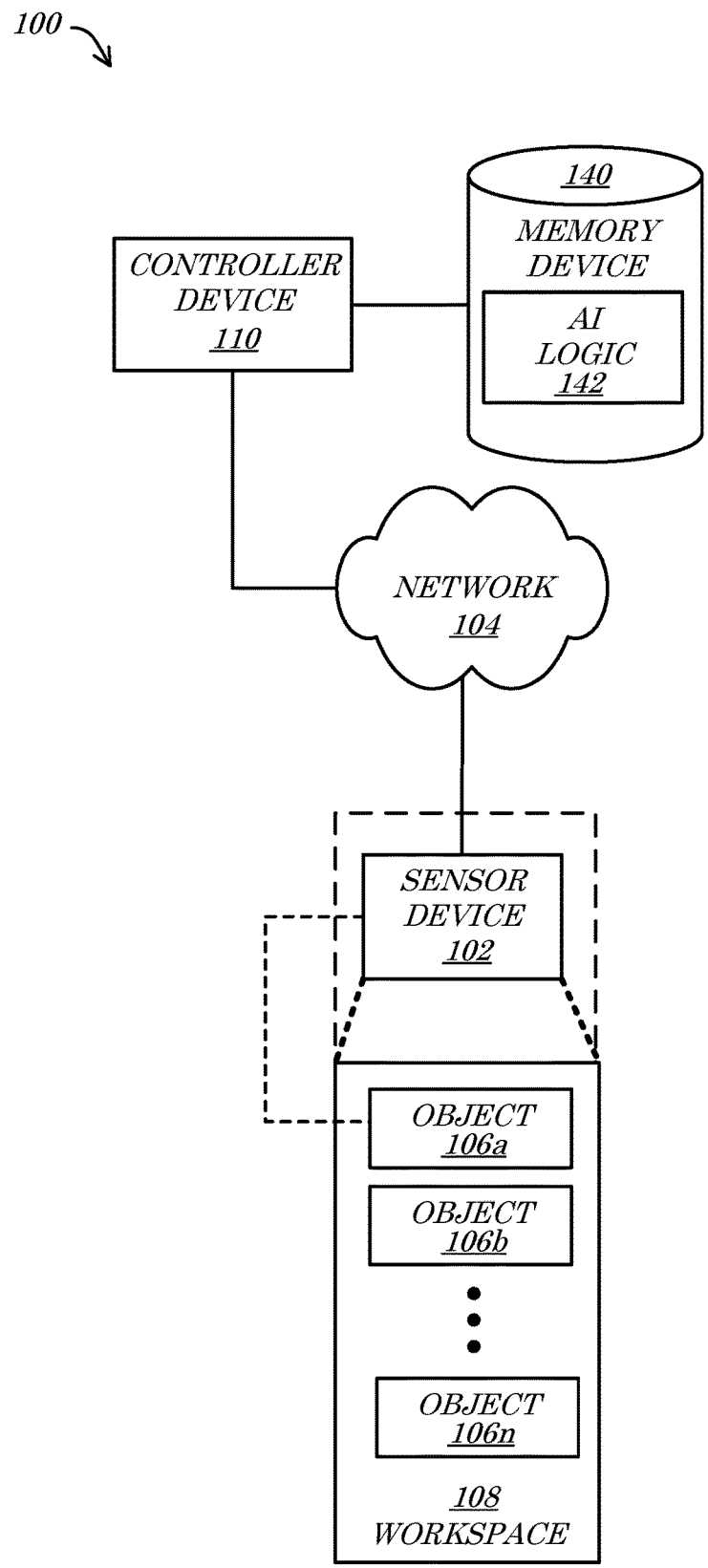
FIG. 1 is a block diagram of a system according to some embodiments.

Businesses that conduct ergonomic assessments and/or employ ergonomic workspace designs for their employees typically rely on trained ergonomic analysts inspecting and evaluating employee workspaces. While this method is effective, it requires additional resources and is inefficient. Costs, inefficiencies, and even capabilities are further strained in the case of remote workers utilizing remote workspaces. The option for remote work has increased steadily for many years, with significant percentages of computer-based workers spending at least a portion of their time working remotely from their typical work environment. As the percentage of workers utilizing home (or otherwise remote) workspaces has increased dramatically during the COVID-19 pandemic, the number of remote workspaces has increased dramatically. Because such remote workspaces are likely not designed as workspaces, for they are typically in workers' homes, as opposed to in office building or the like, the need for ergonomic assessment of these spaces is greater than for standard in-office workspaces. However, the distributed nature of these spaces, combined with the necessary privacy of workers' homes, severely limits the access that professional ergonomic analysts have with respect to these spaces.

In accordance with embodiments herein, these and other deficiencies of existing systems are remedied by providing systems, apparatus, methods, and articles of manufacture for Artificial Intelligence (AI) ergonomic analysis and positioning. In some embodiments, for example, AI-based ergonomic analysis may comprise (i) acquiring one or more images (and/or other data) descriptive of a workspace/work area, (ii) identifying (e.g., utilizing AI image processing logic) at least one object in the workspace, (iii) classifying (e.g., utilizing AI object classification processing logic) the at least one object, (iv) identifying and/or computing at least one of a relative and absolute location of the at least one object (e.g., within the workspace), (v) identifying and/or measuring at least one distance between the at least one object and at least one of a point, line, polygon, and/or other object in the workspace, (vi) identifying (e.g., based on the at least one distance) that the at least one object is not properly positioned (e.g., based on application of ergonomic positioning rules), (vii) identifying (e.g., based on application of the ergonomic positioning rules) a target location for the at least one object (e.g., in accordance with the ergonomic positioning rules), (viii) outputting an indication of the target location (e.g., to a user of the workspace), (ix) tracking a movement of the at least one object, (x) identifying that the at least one object has been moved to the target location, and (xi) outputting an indication of the proper placement/movement of the at least one object to the target location.

In accordance with some embodiments, the application of AI ergonomic analysis and/or positioning, as described herein, may provide a reduction in computer processing resources, a reduction in necessary memory storage requirements, and other technical improvements. The particular AI ergonomic analysis and/or positioning systems and methods described herein may, for example, permit available processing and memory resources to be utilized to achieve accurate remote workspace ergonomic analysis without requiring complicated hardware, large capital outlays, and/or specialized training. According to some embodiments, an untrained end user may be guided through the data acquisition, ergonomic analysis, and/or ergonomic positioning process via a remote telepresence session and/or AI-driven prompts. In such a manner, for example, specialized personnel and equipment may no longer be necessary to conduct ergonomic analysis, greatly reducing costs, reducing the amount of time required to conduct ergonomic analysis and/or assessments, and/or reducing bandwidth constraints in electronic networks.

II. AI Ergonomic Analysis and Positioning Systems

Referring first to FIG. 1, a block diagram of a system 100 according to some embodiments is shown. In some embodiments, the system 100 may comprise a user and/or sensor device 102 communicatively coupled to a network 104. In some embodiments, the sensor device 102 may comprise an imaging and/or other input device that is disposed to capture data descriptive of one or more objects 106a-n at a location, such as a workspace 108. According to some embodiments, the sensor device 102 may be in communication with (e.g., via the network 104) and/or may provide indications of the data to a controller device 110. According to some embodiments, the controller device 110 and/or the sensor device 102 may be in communication with (e.g., via the network 104) a memory device 140 (e.g., storing AI logic 142). In accordance with various embodiments herein, the sensor device 102 may be utilized to direct, manage, and/or define the capture of imagery (and/or other sensor data) of the location 108 and/or the one or more objects 106a-n thereof. In some embodiments, the captured imagery/data may be provided from the sensor device 102 to the controller device 110 for imagery/sensor data analysis and execution of stored analysis rules and/or logic (e.g., the AI logic 142). In such a manner, for example, data descriptive of the objects 106a-n may be input into the system 100 and utilized to identify the objects 106a-n and compute ergonomic analytic metrics (e.g., an ergonomic assessment) for the location 108 and/or the one or more objects 106a-n to identify, facilitate, and/or conduct a positioning (and/or repositioning) of one or more of the objects 106a-n in accordance with ergonomic goals.

Fewer or more components 102, 104, 106a-n, 108, 110, 140, 142 and/or various configurations of the depicted components 102, 104, 106a-n, 108, 110, 140, 142 may be included in the system 100 without deviating from the scope of embodiments described herein. In some embodiments, the components 102, 104, 106a-n, 108, 110, 140, 142 may be similar in configuration and/or functionality to similarly named and/or numbered components as described herein. In some embodiments, the system 100 (and/or portions thereof) may comprise an automatic AI ergonomic analysis and/or positioning program, system, and/or platform programmed and/or otherwise configured to execute, conduct, and/or facilitate the method 400 of FIG. 4 herein, and/or portions thereof.

The sensor device 102, in some embodiments, may comprise any type or configuration of device, sensor, and/or object that is capable of capturing imagery and/or other data descriptive of the location 108 and/or the objects 106a-n thereof. The sensor device 102 may comprise, for example, a camera (e.g., coupled to and/or integral with a user device (not separately shown), such as the Pro 12MP or Dual 12MP camera available on the iPhone® 12 Pro or iPhone® 12, respectively, manufactured by Apple®, Inc. of Cupertino, CA) and/or a ranging device, such as a Light Detection and Ranging (LiDAR) device. In some embodiments, the sensor device 102 may comprise a stand-alone device (e.g., separate from a user device), such as Logitech® PTZ Pro 2—Conference camera with a ninety degree (90°) diagonal Filed of View (FoV), including a microphone, and capable of capturing Full High Definition (FHD) 1080p video at a resolution of one thousand nine hundred twenty by one thousand eighty (1920×1080) pixels and at a speed of thirty frames per second (30 fps) available from Logitech Inc. of Newark, CA, or a Razer® Kiyo™ webcam capable of capturing images at a resolution of four mexapixels (4 MP) available from Razer Inc. of Irvine, CA. In some embodiments, the sensor device 102 may comprise a multispectral imaging device capable of capturing three or four band imagery data (e.g., RGB plus Near IR). The imagery and/or other data captured by the sensor device 102 may generally comprise any type, quantity, and/or format of photographic, video, and/or other sensor data descriptive of the workspace 108 and/or the objects 106a-n thereof. According to some embodiments, the data captured and/or acquired by the sensor device 102 may comprise one or more images captured from different positions and/or locations in or proximate to the workspace 108, such as a plurality of individual images taken at different bearings from a given position and/or a single panoramic image taken from the given position.

In some embodiments, the sensor device 102 may also or alternatively comprise a server and/or datastore (e.g., the controller 110 and/or the memory device 140) that is configured to provide the imagery and/or other data descriptive of the workspace 108 and/or the objects 106a-n. The sensor device 102 may comprise, for example, a third-party and/or vendor device configured to supply imagery and/or other sensor data acquired from various cameras, sensors, and/or other sources. According to some embodiments, the sensor device 102 may comprise a user device incorporating sensor capabilities, such as any type or configuration of computing, mobile electronic, network, user, and/or communication device that is or becomes known or practicable. The sensor device 102 may, for example, comprise one or more tablet computers, such as an iPad® manufactured by Apple®, Inc. of Cupertino, CA, and/or cellular and/or wireless telephones or "smart" phones, such as an iPhone® (also manufactured by Apple®, Inc.) or an Optimus™ S smart phone manufactured by LG® Electronics, Inc. of San Diego, CA, and running the Android® operating system from Google®, Inc. of Mountain View, CA. In some embodiments, the sensor device 102 may comprise one or more devices owned and/or operated by one or more users, such as a remote worker, employee, etc. According to some embodiments, the sensor device 102 may communicate with the controller device 110 via the network 104 to provide imagery and/or other data captured by the sensor device 102 for analysis and/or assessment of the workspace 108, as described herein. According to some embodiments, the sensor device 102 may store and/or execute specially programmed instructions (such as a mobile device application) to operate in accordance with embodiments described herein. The sensor device 102 may, for example, execute one or more mobile device programs that activate and/or control the sensor device 102 and/or that analyze imagery and/or other data of the workspace 108 and/or the objects 106a-n, e.g., to identify, locate, and/or classify one or more of the objects 160a-n, identify one or more rules associated with the objects 106a-n, evaluate the one or more rules, compute an ergonomic assessment based on the evaluation of the rules, and/or provide output to guide a user to properly position and/or reposition one or more of the objects 106a-n in accordance with ergonomic rules.

The network 104 may, according to some embodiments, comprise a Local Area Network (LAN; wireless and/or wired), cellular telephone, Bluetooth® and/or Bluetooth®

Low Energy (BLE), Near Field Communication (NFC), and/or Radio Frequency (RF) network with communication links between the controller device 110, the sensor device 102, and/or the memory device 140. In some embodiments, the network 104 may comprise direct communications links between any or all of the components 102, 110, 140 of the system 100. The sensor device 102 may, for example, be directly interfaced or connected to the controller device 110 via one or more wires, cables, wireless links, and/or other network components, such network components (e.g., communication links) comprising portions of the network 104. In some embodiments, the network 104 may comprise one or many other links or network components other than those depicted in FIG. 1. The sensor device 102 may, for example, be connected to the controller device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102, 110, 140 of the system 100. The network 104 may comprise one or more cellular telephone networks with communication links between the sensor device 102 and the controller device 110, for example, and/or may comprise a BLE, NFC, RF, and/or "personal" network comprising short-range wireless communications between the sensor device 102 and one or more of the objects 106*a*-*n*, for example.

In some embodiments, the objects 106*a*-*n* may comprise any type and/or quantity of objects disposed in or at the workspace 108. The objects 106*a*-*n* may comprise static, dynamic, non-electronic, and electronic object types. The objects 106*a*-*n* may comprise, for example, any type and/or number of chairs (or other seating elements), cushions, foot rests, desks, mouse pads, cabinets, lamps, etc. In some embodiments, the objects 106*a*-*n* may comprise one or more electronic and/or electro-mechanical devices such as computers (e.g., desktops, laptops, tablets, etc.), keyboards, computer mice (and/or other pointing or input devices), speakers, display screens (e.g., monitors), peripherals, wearables (such as smart watches), etc. According to some embodiments, one or more of the objects 106*a*-*n*, such as a first object 106*a*, as depicted, may be in communication with the sensor device 102. The first object 106*a* may, for example, provide and/or transmit location and/or movement information to the sensor device 102, e.g., to facilitate tracking and/or location identification (of the first object 106*a*) by the sensor device 102. In some embodiments, the first object 106*a* may comprise a communication device (not separately shown) operable to transmit and/or receive data and/or may comprise one or more motors, actuators, solenoids, switches, lights, and/or other input and/or output devices operable to be controlled upon receipt of appropriate commands (e.g., sent from the sensor device 102 and/or the controller device 110).

According to some embodiments, the workspace 108 may comprise any location desired for ergonomic analysis, assessment, and/or positioning, such as a location from which a user/employee/worker conducts remote work (and/or distributed work). In some embodiments, the workspace 108 may be identified by one or more location parameters, such as an address, postal code, map quadrant, a particular building and/or structure, a room, and/or one or more coordinates and/or other identifiers (e.g., a unique geo-referenced location identifier, such as latitude and longitude coordinates and/or a Global Positioning System (GPS) coordinate). According to some embodiments, the workspace 108 may comprise the one or more objects 106*a*-*n*. In the case that the workspace 108 comprises a room (or other interior structural space), for example, the objects 106*a*-*n* may comprise various furnishings (e.g., moveable objects, such as couches (e.g., sofas), chairs, tables, lamps, rugs, etc.), materials, such as flooring or wall coverings (e.g., structural finishing), fixtures (e.g., plumbing, electrical, and/or other fixtures), work devices (such as computers, peripherals, input devices, output devices, tools, and/or machinery), and/or features, such as windows, doors, doorways, niches, coffers, stairways, fireplaces, etc. According to some embodiments, the workspace 108 may be identified by a unique identifier and/or code that is stored (e.g., in the memory device 140) in relation to (e.g., creating a stored link with) the workspace 108 and/or its associated location parameters.

In some embodiments, the controller device 110 may comprise an electronic and/or computerized controller device, such as a computer server and/or server cluster communicatively coupled to interface with the sensor device 102 (directly and/or indirectly). The controller device 110 may, for example, comprise one or more PowerEdge™ M910 blade servers manufactured by Dell®, Inc. of Round Rock, TX, which may include one or more Eight-Core Intel® Xeon® 7500 Series electronic processing devices. According to some embodiments, the controller device 110 may be located remotely from the sensor device 102 and/or the workspace 108. The controller device 110 may also or alternatively comprise a plurality of electronic processing devices located at one or more various sites and/or locations (e.g., a distributed computing and/or processing network), such as the workspace 108.

According to some embodiments, the controller device 110 may store and/or execute specially-programmed instructions to operate in accordance with embodiments described herein. The controller device 110 may, for example, execute one or more programs that facilitate and/or cause the automatic detection, verification, data capture, and/or data analysis (e.g., ergonomic analysis and/or positioning) of the workspace 108 and/or the objects 106*a*-*n*, as described herein. According to some embodiments, the controller device 110 may comprise a computerized processing device, such as a PC, laptop computer, computer server, and/or other network or electronic device, operated to manage and/or facilitate AI ergonomic analysis and positioning in accordance with embodiments described herein.

In some embodiments, the controller device 110 and/or the sensor device 102 (and/or one or more of the objects 106*a*-*n*) may be in communication with the memory device 140. The memory device 140 may store, for example, user/employee data, location data (such as coordinates, distances, etc.), security access protocol and/or verification data, polygon and/or template data, object classification data, scoring data, ergonomic analysis and/or assessment data and/or logic (such as ergonomic rules), and/or instructions that cause various devices (e.g., the controller device 110, the sensor device 102, and/or one or more of the objects 106*a*-*n*) to operate in accordance with embodiments described herein. In some embodiments, the memory device 140 may comprise any type, configuration, and/or quantity of data storage devices that are or become known or practicable. The memory device 140 may, for example, comprise an array of optical and/or solid-state hard drives configured to store data descriptive of the objects 106a-n, device identifier data, user identifier data, data descriptive of the workspace 108, AI logic and/or training data, image (and/or other sensor data) analysis data, image (and/or other sensor data) processing data, and/or various operating instructions, drivers, etc. In some embodiments, the memory device 140 may comprise a stand-alone and/or networked data storage device, such as a solid-state and/or non-volatile memory card (e.g., a Secure Digital (SD) card, such as an SD Standard-Capacity (SDSC), an SD High-Capacity (SDHC), and/or an SD eXtended-Capacity (SDXC), and any various practicable form-factors, such as original, mini, and micro sizes, such as those available from Western Digital Corporation of San Jose, CA). While the memory device 140 is depicted as a stand-alone component of the system 100 in FIG. 1, the memory device 140 may comprise multiple components. In some embodiments, a multi-component memory device 140 may be distributed across various devices and/or may comprise remotely dispersed components. Any or all of the sensor device 102 and/or the controller device 110 (and/or one or more of the objects 106a-n) may comprise the memory device 140 or a portion thereof, for example.

Figure 2:
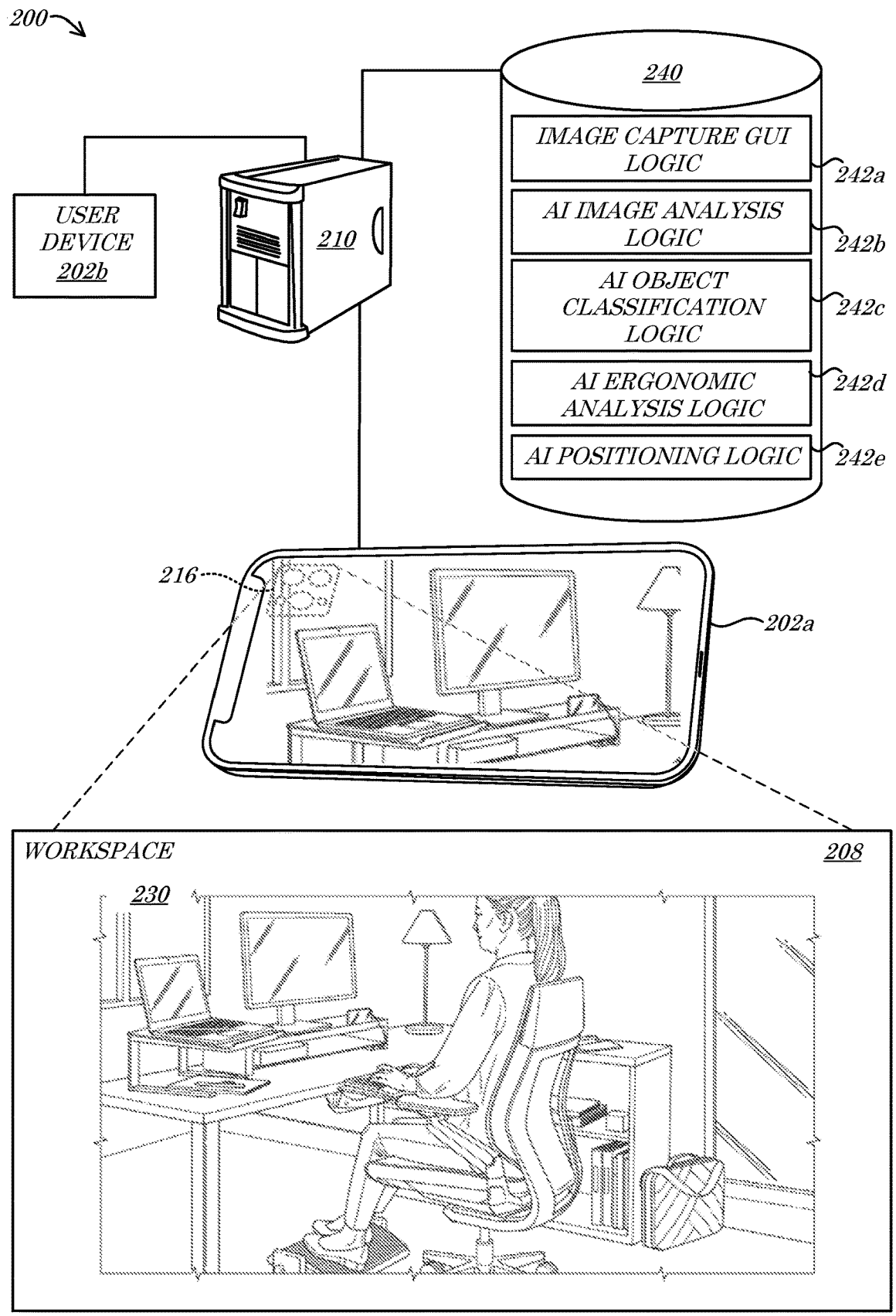
FIG. 2 is a diagram of a system according to some embodiments.

Turning to FIG. 2, a diagram of a system 200 according to some embodiments is shown. In some embodiments, the system 200 may comprise an AI ergonomic analysis and positioning system similar to the system of FIG. 1 herein. The system 200 may comprise, for example, one or more user or sensor devices 202a-b, a camera 216 (and/or other sensor) disposed to capture data descriptive of a workspace 208, and/or a server 210. According to some embodiments, a first user or sensor device 202a may comprise a mobile electronic device, such as a smart phone, equipped with a built-in camera 216. In some embodiments, the camera 216 may be utilized (e.g., as directed and/or controlled by the first user/sensor device 202a) to acquire image data (and/or other sensor data, such as distance measurements) from the workspace 208, such as an image 230. While the image 230 is depicted for ease of explanation, in some embodiments the image 230 may comprise a plurality of related and/or overlapping images, a stitched image, and/or other data elements, such as coordinate, distance, location, temperature, color, and/or other data arrays, matrices, lists, etc.

According to some embodiments, a second user/sensor device 202b may be utilized to access and/or control the server 210 and/or to interface with the first user/sensor device 202a. In some embodiments, the second user/sensor device 202b may provide data descriptive of the workspace 208, such as data descriptive of previous assessments, demographic data, medical data (e.g., historic medical data and/or current condition and/or pain level data), environmental data (e.g., temperature, humidity, light levels, noise levels), and/or other data acquired at least in part separately from the data acquired from the first user/sensor device 202a. According to some embodiments, the server 210 may coordinate and/or broker communications between the user/sensor devices 202a-b. The second user/sensor device 202b may, for example, be utilized to provide instructions, commands, prompts, and/or other data to the first user/sensor device 202a, such data being descriptive of desired information to be captured and/or acquired from the workspace 208. According to some embodiments, the first user/sensor device 202a comprises a mobile electronic device (as depicted) disposed at or proximate to the workspace 208 that is operated by a first user (not shown), such as a remote worker at the workspace 208. In some embodiments, the second user/sensor device 202b may comprise a device remote from the workspace 208 that is operated by a second user (also not shown), such as an ergonomic assessment resource/expert. In such embodiments, the second user may utilize the second user/sensor device 202b to provide direction, requests, and/or instruction to the first user utilizing the first user/sensor device 202a. In such a manner, for example, the second user may assist and/or direct the first user in conducting the tasks (e.g., local to the first user/sensor device 202a) that should be accomplished to acquire desired information descriptive of the workspace 208—e.g., the image 230.

In some embodiments, data captured and/or acquired by the first user/sensor device 202a and/or by the camera 216 may be transmitted from the first user/sensor device 202a to the server 210. Once acquired, for example, the image 230 and/or data descriptive thereof (e.g., tags, metadata) may be transmitted from the first user/sensor device 202a to the server 210 (e.g., via a wireless network; not shown). According to some embodiments, the server 210 may forward and/or provide the data (e.g., the image 230) to the second user/sensor device 202b and/or may conduct an AI-based ergonomic assessment of the workspace 208 based on the acquired data. The server 210 may, for example, access a data storage device 240 storing a plurality of instructions 242a-e. In some embodiments, the server 210 may execute one or more of the instructions 242a-e to analyze and/or assess the data (e.g., the image 230) provided by the camera 216. The server 210 may, for example, execute a first or image capture Graphical User Interface (GUI) logic 242a to provide a GUI to the first user/sensor device 202a. The GUI may, in some embodiments, provide instructions, prompts, and/or may incorporate feedback (e.g., messages, notes) from the second user/sensor device 202b, directed to acquiring the image 230 by the camera 216. Such a GUI may, for example, provide on-screen prompts (not shown), such as bounding boxes, directional queues, etc., that facilitate and/or direct the capturing of the image 230 (and/or of other data).

According to some embodiments, the server 210 may execute a second or AI image analysis logic 242b. The AI image analysis logic 242b may, for example, define instructions that are operable to identify and/or locate various objects (not separately labeled in FIG. 2) in the image 230 (e.g., at the workspace 208), identify a position of the camera 216 (e.g., at a time when the image 230 is captured), identify walls, ceilings, and/or floors, define an array of coordinates and/or points descriptive of the workspace 208, conduct an ergonomic assessment of the workspace 208, and/or facilitate, direct, and/or cause a positioning and/or repositioning of an object in accordance with the ergonomic assessment. In some embodiments, the AI image analysis logic 242b may comprise instructions developed automatically by operation of an AI process that is seeded with a training data set (not shown). The AI image analysis logic 242b may be trained, for example, utilizing a plurality of other images (not shown) and associated analysis and/or assessment results, such that the AI image analysis logic 242b may reverse engineer and/or derive a set of rules, thresholds, and/or decision trees for detection and/or identification of image artifacts and/or characteristics defined by various data patterns therein. According to some embodiments, the AI image analysis logic 242b may be utilized to identify objects that are relevant to ergonomic assessments (e.g., chairs, desks, keyboard, computer mice, display screens, etc.).

In some embodiments, the server 210 may execute a third or AI object classification logic 242c. The AI object classification logic 242c may, for example, comprise rules defining various known object types, such as various makes, models, and/or serial numbers of manufactured objects. According to some embodiments, the objects may be defined by image and/or data patterns representative of the objects and stored in the data storage device 240 (and/or identified or detected by the AI image analysis logic 242b). In some embodiments, the AI object classification logic 242c may comprise instructions developed automatically by operation of an AI process that is seeded with a training data set (not shown). The AI object classification logic 242c may be trained, for example, utilizing a plurality of other images (not shown) and pre-identified and/or classified objects, such that the AI object classification logic 242c may reverse engineer and/or derive a set of rules, thresholds, and/or decision trees for object identification and/or classification. According to some embodiments, the AI object classification logic 242c may input results from the AI image analysis logic 242b and may process the results to identify and/or classify a plurality of objects in, at, or proximate to the workspace 208 (e.g., such objects being represented by at least a portion of the image 230).

According to some embodiments, the server 210 may execute a fourth or AI ergonomic analysis logic 242d that operates to automatically and dynamically assess the workspace 208. Relational (and/or absolute) location metrics derived from the analyzed image 230 may, for example, be utilized to generate, define, and/or process a three-dimensional point cloud and/or model of the workspace 208. In some embodiments, location, position, and/or orientation metrics descriptive of the various identified objects may be utilized as inputs, for example, that are processed in accordance with AI ergonomic assessment rules, thresholds, and/or criteria. In some embodiments, the AI ergonomic analysis logic 242d may comprise instructions developed automatically by operation of an AI process that is seeded with a training data set (not shown). The AI ergonomic analysis logic 242d may be trained, for example, utilizing a plurality of previous ergonomic assessment results and/or data, such that the AI ergonomic analysis logic 242d may reverse engineer and/or derive a set of rules, thresholds, and/or decision trees for ergonomic analysis. The AI ergonomic analysis logic 242d may, for example, compare and/or compute location data derived from the image 230 to measure and/or calculate relational data metrics for one or more identified and/or classified objects in, at, or proximate to the workspace 208. Such mathematical logic, formulas, and/or models may be utilized, for example, to measure distances between objects and/or across or between various portions of the workspace 208 (e.g., via a three-dimensional model of the workspace 208 generated from the image 230). In some embodiments, the AI ergonomic analysis logic 242d may process input data from the AI image analysis logic 242b and/or the AI object classification logic 242c to produce ergonomic assessment and/or analysis output as a quantitative result, such as a score and/or ranking, and/or a qualitative result (such as "chair seat is two inches too low").

According to some embodiments, the server 210 may execute a fifth or AI positioning logic 242e that utilizes a result from the AI ergonomic analysis logic 242d as input to compute, derive, define, and/or identify a desired or "target" location for at least one of the objects at the workspace 208. The AI ergonomic analysis logic 242d may identify and/or define one or more objects that require adjustment, reorientation, and/or repositioning, for example (e.g., based on one or more ergonomic distance and/or positioning rules), and the AI positioning logic 242e may utilize such data to identify, compute, and/or define a target orientation, setting, and/or location for the object. In some embodiments, the AI positioning logic 242e may generate output descriptive of the target location, setting, and/or orientation, e.g., to guide a remote worker/user to alter the workspace 208 in accordance with ergonomic rules and/or criteria. In some embodiments, such output may be provided via the first user/sensor device 202a. According to some embodiments, the AI positioning logic 242e may command and/or otherwise cause (e.g., via direct and/or indirect communications) an object to automatically reposition, reorient, change locations, and/or otherwise adjust in accordance with one or more target orientations, settings, locations, etc.

Fewer or more components 202a-b, 208, 210, 216, 230, 240, 242a-e and/or various configurations of the depicted components 202a-b, 208, 210, 216, 230, 240, 242a-e may be included in the system 200 without deviating from the scope of embodiments described herein. In some embodiments, the components 202a-b, 208, 210, 216, 230, 240, 242a-e may be similar in configuration and/or functionality to similarly named and/or numbered components as described herein. In some embodiments, the system 200 (and/or portions thereof) may comprise an automatic AI ergonomic analysis and/or positioning program, system, and/or platform programmed and/or otherwise configured to execute, conduct, and/or facilitate the method 400 of FIG. 4 herein, and/or portions thereof.

Figure 3A:
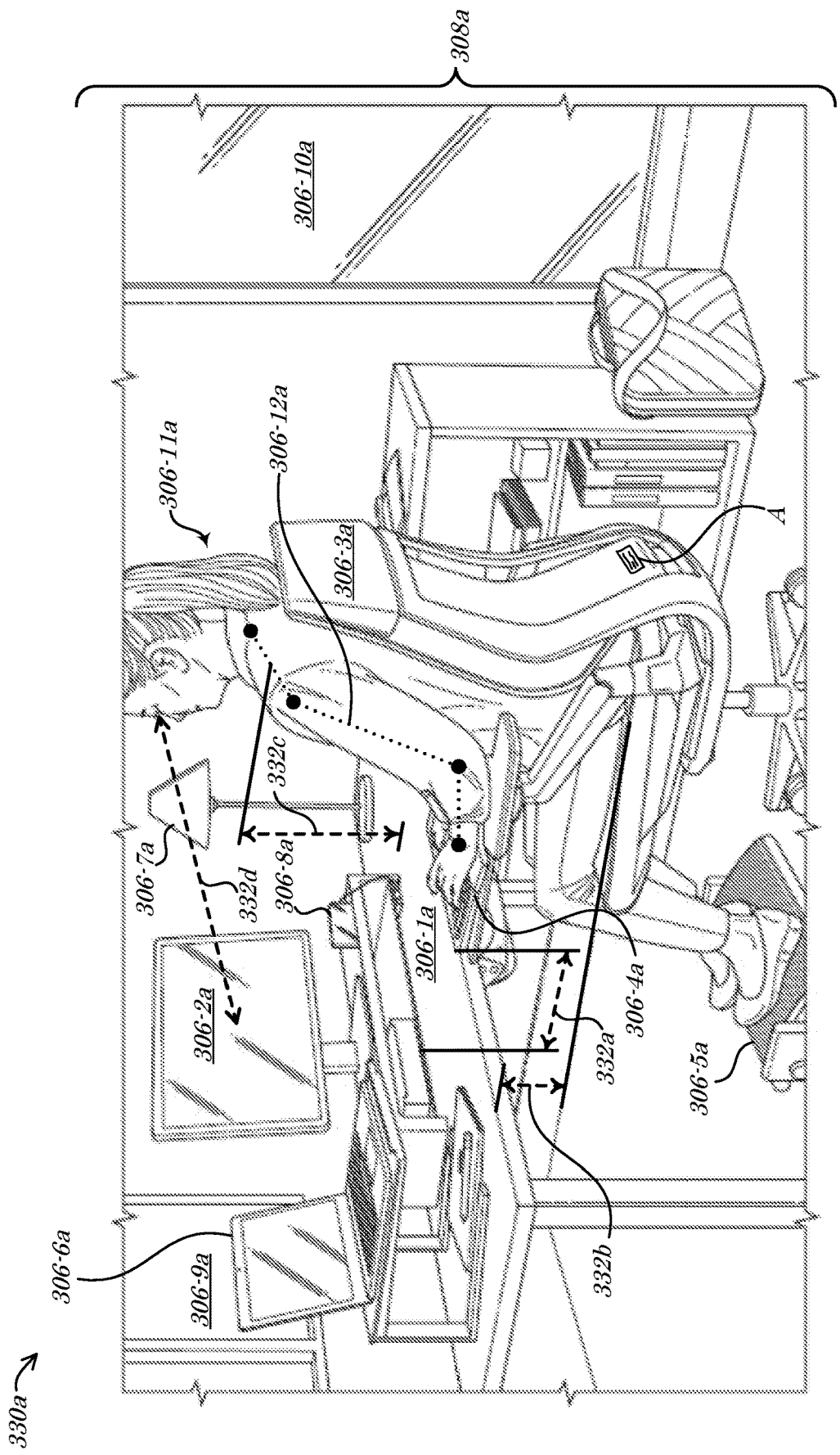
FIG. 3A and FIG. 3B are diagrams of example images according to some embodiments.
Figure 3B:
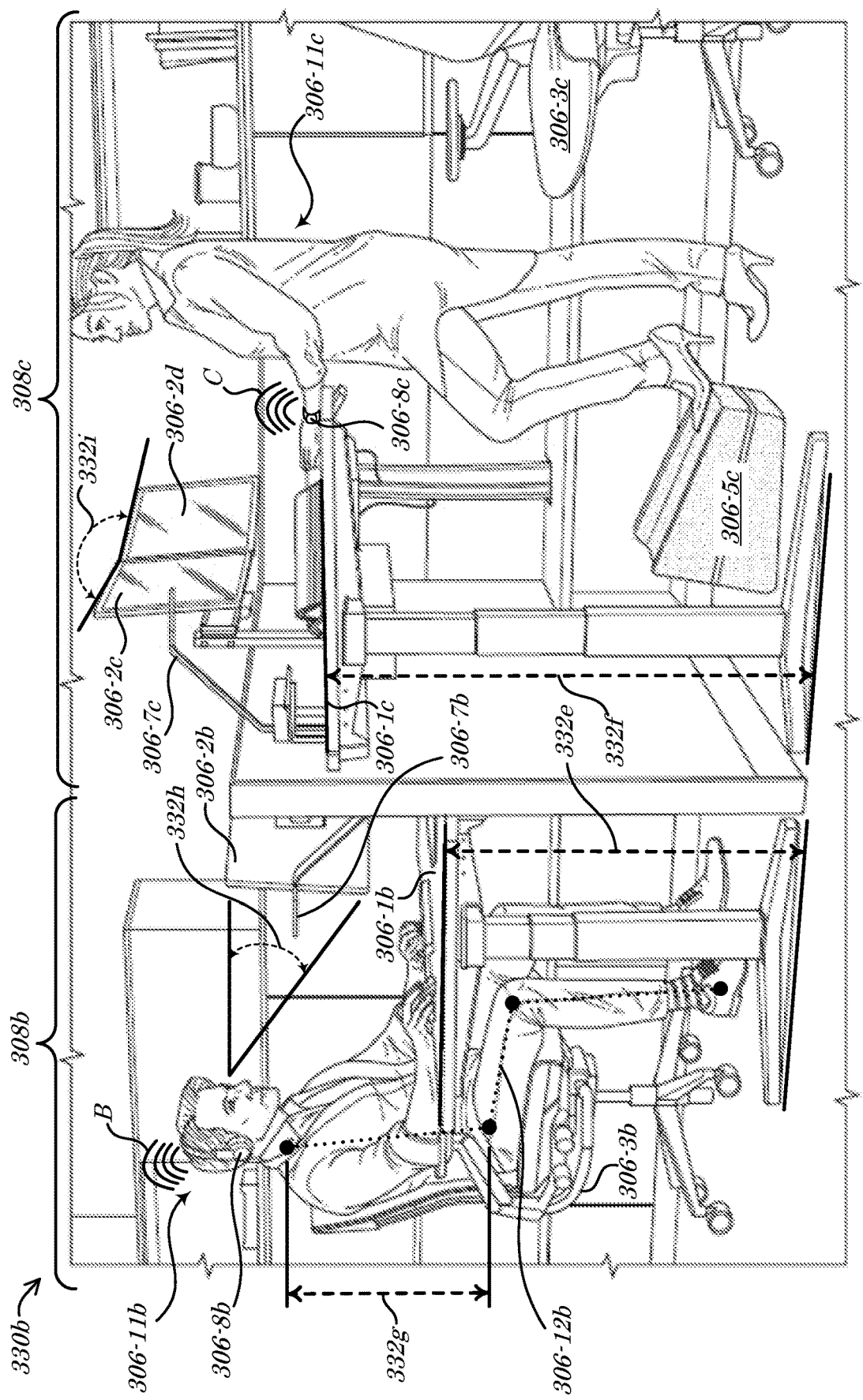

Referring now to FIG. 3A and FIG. 3B, diagrams of example images 330a-b according to some embodiments are shown. In some embodiments, the example images 330a-b (referred to as the "images" 330a-b, for ease of reference only) may comprise a captured and/or recorded depiction (graphical, numerical, and/or referential) of a location, such as a room in a building (or other property, parcel, etc.). As depicted in FIG. 3A and FIG. 3B for non-limiting purposes of example, a first image 330a may be descriptive of a first workspace 308a and/or a second image 330b may be descriptive of a second workspace 308b and/or a third workspace 308c. In some embodiments, the images 330a-b may comprise a plurality of features and/or characteristics that are identified by an image processing application, such as an AI-enabled object recognition program. In some embodiments, the images 330a-b may comprise and/or define, for example, a plurality of objects (referred to collectively as objects 306, for ease of reference) such as desks 306-1a, 306-1b, 306-1c, computer monitors (or other display screens) 306-2a, 306-2b, 306-2c, 306-2d, chairs (and/or other seating or human-positioning devices) 306-3a, 306-3b, 306-3c, a keyboard 306-4a, foot rests 306-5a, 306-5c, a computer 306-6a, lighting devices 306-7a, 306-7b, 306-7c, peripherals 306-8a, 306-8b, 306-8c, building features 306-9a, furnishings 306-10a, humans (e.g., users and/or workers) 306-11a, 306-11b, 306-11c, and/or human dimensions 306-12a, 306-12b.

In some embodiments, the images 330a-b may be captured and/or acquired from and/or defined by any quantity and/or type of sensors that are or become known or practicable. One or more cameras (not shown), such as webcams, security cameras, hand-held cameras, motion sensors, measuring devices, and/or other sensors may, for example, provide data (e.g., to an AI ergonomic analysis and/or positioning system) defining the images 330a-b. While the images 330a-b are depicted for purposes of non-limiting example as images captured from locations proximate to and oriented towards the respective workspaces 308a-c, such as may be captured by a hand-held camera positioned approximately ten (10) feet from the workspaces 308a-c, the images 330a-b may comprise any type, orientation, configuration, and/or quantity of data sets descriptive of the workspaces 308a-c. Some or all of the data defining the images 330a-b (and/or the workspaces 308a-c), for example, may be captured and/or sensed or measured by a first peripheral or cell phone 306-8a (e.g., having a camera and/or a LiDAR device; neither of which is separately shown), a camera (not separately depicted) of the computer 306-9a, second and/or third variable desks (e.g., variable height desks) 306-1b, 306-1c (e.g., height sensors thereof; not separately shown), a second peripheral or headset 306-8b, and/or a third peripheral or smart watch 306-8c. According to some embodiments, while the data conveyed by the images 330a-b is presented as visual/imagery data for ease of illustration, the data may also or alternatively comprise any type or quantity of underlying data, such as coordinates, location data, size data, perimeter data, movement data, etc. In some embodiments, the images 330a-b and/or other data may comprise data descriptive of the workspaces 308a-c with or without human occupation (e.g., reflecting the presence or absence of the humans 306-11a, 306-11b, 306-11c).

According to some embodiments, any or all of the objects 306 may be utilized by processes described herein to effectuate AI ergonomic analysis and/or positioning. An AI image analysis and/or ergonomic analysis and/or positioning program may, for example, process one or more of the images 330a-b and identify and classify the plurality of objects 306, e.g., based on application of AI object identification (e.g., pattern recognition) and/or classification logic. The AI program(s) may be coded, in some embodiments, to evaluate lines and/or patterns within the images 330a-b to identify and/or classify any or all of the plurality of objects 306. According to some embodiments, lines, patterns, and/or pixels in the images 330a-b may be analyzed (e.g., by the AI program) to identify one or more of the objects 306. The images 330a-b may be systematically analyzed, for example, to identify patterns that match patterns and/or characteristics stored in memory (e.g., a database; not shown). The AI program may analyze the images 330a-b and identify a match between stored feature data and a third lighting device 306-7c, for example. According to some embodiments, the matching of the geometries, image artifacts (e.g., lines, colors, pixels, hue, saturation, etc.), and/or other data may permit a cross-reference to a categorization of the third lighting device 306-7c. Stored data may relate the third lighting device 306-7c to a stored indication of a natural light desk lamp, for example, and/or to a specific type of natural light desk lamp such as a Verilux® smartlight LED desk lamp available from Verilux, Inc. of Waitsfield, VT. In some embodiments, AI image processing may also or alternatively identify and/or classify keyboard 306-4a as a computer keyboard, or for example, a Corsair® K100™ RGB Optical-Mechanical Gaming Keyboard available from Corsair Gaming, Inc. of Fremont, CA.

Any or all of the objects 306 may also or alternatively be identified, classified, and/or tracked utilizing various encoded data. Human and/or computer-readable data described by (e.g., visible in) the images 330a-b such as a tag or label "A" (as depicted in FIG. 3A) on a first chair 306-3a may, for example, be identified by OCR and/or other image and/or data analysis and utilized to identify and/or classify one or more related objects 306, such as the first chair 306-3a upon which the label "A" is affixed. According to some embodiments, encoded data may comprise data received (e.g., wirelessly) from one or more of the objects 306, such as from the headset 306-8b via a signal "B" and/or from the smart watch 306-8c via a signal "C" (both as depicted in FIG. 3B).

According to some embodiments, relative (and/or absolute) spatial relationships between the identified/classified objects 306 may be identified, measured, and/or calculated. In some embodiments, various measurements, calculations, and/or determinations may be derived from the images 330a-b. In some embodiments, for example, the images 330a-b (and/or the workspaces 308a-c) may be parsed into and/or assigned a coordinate reference system. According to some embodiments, a rectilinear coordinate system identifying various points throughout each workspace 308a-c may be identified, computed, and/or assigned. In some embodiments, an array of coordinates assigned to the images 330a-b (and/or the workspaces 308a-c) may correspond to (and/or be mapped to) each pixel or instance of data that comprises the images 330a-b. In such a manner, for example, each pixel of the images 330a-b may be uniquely identified and/or referenced with respect to other pixels (e.g., presuming that the size of the pixels is known, calculated, and/or otherwise derived). According to some embodiments, the array of coordinates may be utilized to evaluate the various objects 306. The coordinates may be utilized, along with referential distance estimations based on identified objects 306, for example, to estimate sizes, orientations, settings, and/or positions of the various objects 306.

In some embodiments, an object 306, such as a first computer monitor 306-2a, may be analyzed to determine that a range of the coordinates comprising a portion (e.g., a subset) of the images 330a-b (and/or the workspaces 308a-c) that the first computer monitor 306-2a occupies define dimensions of a certain type, size, orientation, style, make, and/or model of computer screen. In the case that the size of the pixels and/or coordinates is known (e.g., pre-programmed and/or derived), the dimensions may be converted into and/or expressed as real-world dimensions representing the estimated size of the first computer monitor 306-2a that is represented in the first image 330a. The dimensional and/or sizing information may then be utilized, according to some embodiments, to assess the objects 306 (e.g., the first computer monitor 306-2a), e.g., with respect to the ergonomic arrangement of the workspaces 308a-c.

According to some embodiments, positions and/or distances related to the objects 306 may also or alternatively be processed (e.g., utilizing a stored rule set associated with the different classifications and/or associated ergonomic rules thereof). A first distance and/or dimension 332a between the first computer monitor 306-2a and the keyboard 306-4a may be calculated, for example, based on the relative positions derived for the first computer monitor 306-2a and the keyboard 306-4a. In some embodiments, the first distance 332a may be compared to a stored ergonomic threshold, range, and/or rule regarding desired arrangements of keyboards with respect to computer screens. In the case that the keyboard 306-4a is determined to be closer to the first computer monitor 306-2a than a stored threshold (e.g., the first dimension 332a is less than the threshold), for example, an applicable rule may be identified as not being met. Similarly, an ergonomic rule may be stored that specifies that a seating height of the first chair 306-3a should be within a specific range with respect to a work surface height of the first desk 306-1a, e.g., as identified by a second dimension 332b. In some embodiments, the second dimension 332b may be derived and/or calculated based on the coordinate array assigned and/or derived for the first workspace 308a and compared to the range threshold. In the case that the seat height is determined to be within range (e.g., the second dimension 332b falls between the bounds of the range threshold), the rule may be determined to have been met and/or satisfied (e.g., the height setting of the first chair 306-3a and/or of the first desk 306-1a may be acceptable).

According to some embodiments, a third dimension 332c may comprise a measurement (and/or calculated distance) from a first human dimension 306-12a, such as a shoulder height, above the work surface of the first desk 306-1a. In some embodiments, a fourth dimension 332d may comprise a measurement (and/or calculated distance) representing a sight distance (and/or angle) from an eye (not separately labeled) of a first human/worker 306-11a to a display surface of the first computer monitor 306-2a. According to some embodiments, fifth and sixth dimensions 332e-f may comprise measurements (and/or calculated distance) descriptive of heights of respective work surfaces of a second desk 306-1b and third desk 306-1c above the floor. Some measurements, such as the fifth and sixth dimensions 332e-f, may be derived from setting data descriptive of settings of the second desk 306-1b and/or third desk 306-1c. The second desk 306-1b and/or third desk 306-1c may, as depicted for example, comprise variable height desks that are capable of monitoring, recording, and/or reporting their respective height settings and/or status (e.g., seating mode vs. standing mode). Such settings may be correlated to certain values (e.g., variables) for the fifth and sixth dimensions 332e-f. In some embodiments, measurements of distances and/or angles (and/or areas or volumes) with respect to humans, such as a seventh dimension 332g of a second human dimension 306-12b (e.g., a set of body parameters), may be derived based on analysis of a second human 306-11b, e.g., as described by the second image 330b. According to some embodiments, such seventh dimension 332g may be compared to dimensions of one or more objects 306 to evaluate the relative sizes of the second human 306-11b with respect to the second workspace 308b. The second human 306-11b may be too large for the second chair 306-3b, for example, and/or may have the second desk 306-1b adjusted improperly (e.g., too low) for the size of the second human 306-11b and/or second human dimension 306-12b thereof (e.g., as expressed by the seventh dimension 332g).

In some embodiments, an eighth dimension 332h may comprise a measurement of a Field of View (FoV) of the second human 306-11b. According to some embodiments, the eighth dimension 332h (e.g., an angle and/or cone) may be analyzed to determine whether the second computer monitor 306-2b is properly positioned (e.g., within the FoV) and/or whether light from the second lighting device 306-7b intersects with a screen of the second computer monitor 306-2b within the FoV (e.g., a likely scenario for glare). According to some embodiments, a ninth dimension 332i may comprise a measurement of an angle between two interconnected and/or adjacent screens of third and fourth computer monitors 306-2c, 306-2d. The ninth dimension 332i may be evaluated, for example, to determine whether the angle falls within an acceptable range, e.g., based on a position of a third human 306-11c with respect to the third and fourth computer monitors 306-2c, 306-2d.

In some embodiments, various scores, rankings, determinations, assessment results, and/or other output may be derived, calculated, computed, and/or retrieved based on the various rule evaluations. Instances of compliance with an evaluated ergonomic rule may result in a positive value, score, calculation, and/or metric, for example, while non-compliance with an evaluated ergonomic rule may result in a negative value, score, calculation, and/or metric. According to some embodiments, all scores, values, ranks, and/or metrics may be summed, averaged, and/or otherwise mathematically evaluated to derive an overall or total score, value, rank, and/or metric, thereby defining a qualitative result of an ergonomic analysis.

Fewer or more components 306-1a, 306-1b, 306-1c, 306-2a, 306-2b, 306-2c, 306-2d, 306-3a, 306-3b, 306-3c, 306-4a, 306-5a, 306-5c, 306-6a, 306-7a, 306-7b, 306-7c, 306-8a, 306-8b, 306-8c, 306-9a, 306-10a, 306-11a, 306-11b, 306-11c, 306-12a, 306-12b, 332a-i and/or various configurations of the depicted components 306-1a, 306-1b, 306-1c, 306-2a, 306-2b, 306-2c, 306-2d, 306-3a, 306-3b, 306-3c, 306-4a, 306-5a, 306-5c, 306-6a, 306-7a, 306-7b, 306-7c, 306-8a, 306-8b, 306-8c, 306-9a, 306-10a, 306-11a, 306-11b, 306-11c, 306-12a, 306-12b, 332a-i may be included in the example images 330a-b without deviating from the scope of embodiments described herein. In some embodiments, the components 306-1a, 306-1b, 306-1c, 306-2a, 306-2b, 306-2c, 306-2d, 306-3a, 306-3b, 306-3c, 306-4a, 306-5a, 306-5c, 306-6a, 306-7a, 306-7b, 306-7c, 306-8a, 306-8b, 306-8c, 306-9a, 306-10a, 306-11a, 306-11b, 306-11c, 306-12a, 306-12b, 332a-i may be similar in configuration and/or functionality to similarly named and/or numbered components as described herein. In some embodiments, the example images 330a-b (and/or portions thereof) may comprise an automatic AI ergonomic analysis and/or positioning program, system, and/or platform programmed and/or otherwise configured to execute, conduct, and/or facilitate the method 400 of FIG. 4 herein, and/or portions thereof.

III. AI Ergonomic Analysis and Positioning Processes

Figure 4:
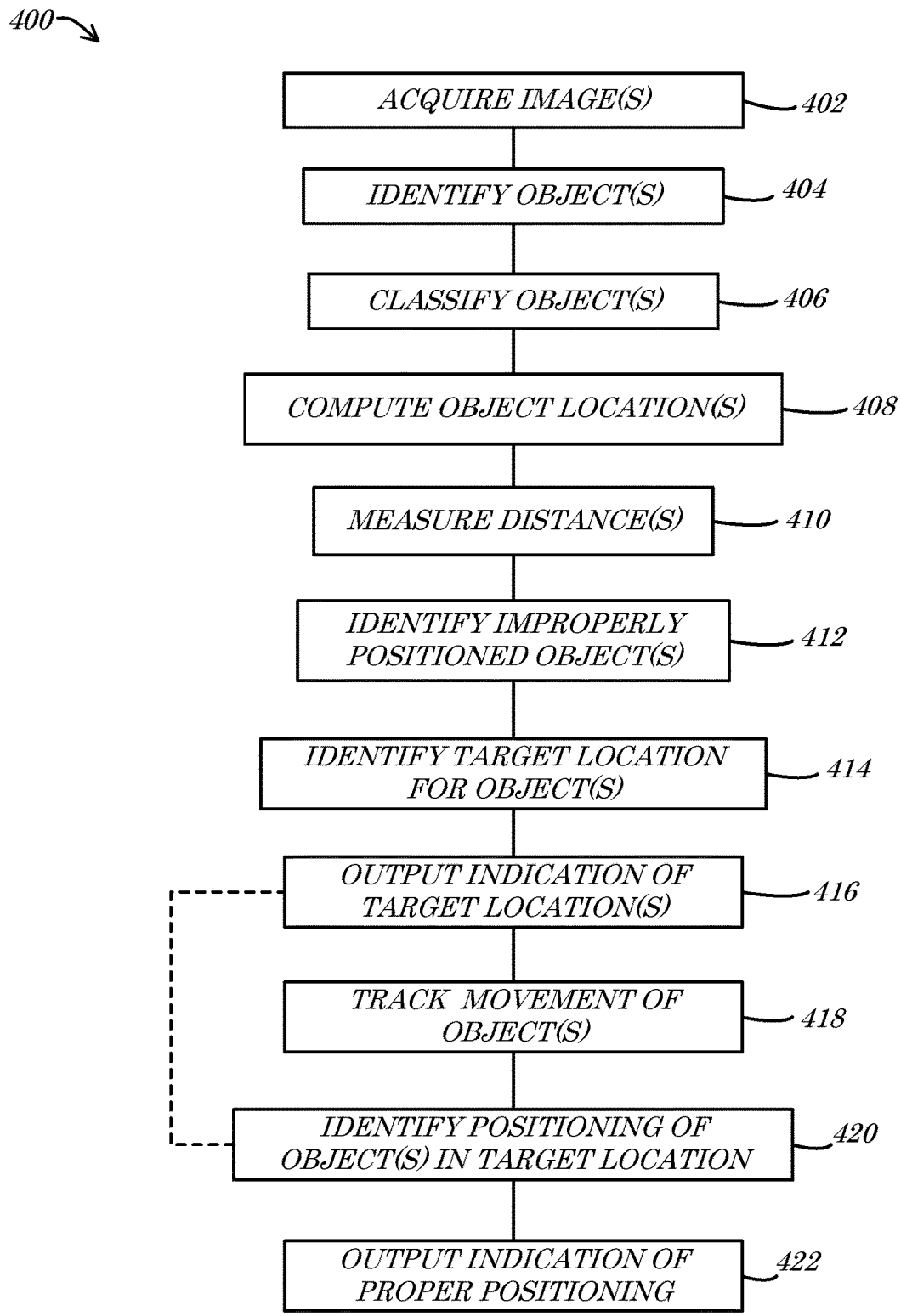
FIG. 4 is a flow diagram of a method according to some embodiments.

Referring now to FIG. 4, a flow diagram of a method 400 according to some embodiments is shown. In some embodiments, the method 400 may be performed and/or implemented by and/or otherwise associated with one or more specialized and/or specially-programmed computers (e.g., one or more of the user/sensor devices 102, 202a-b, the controller device/server 110, 210, and/or the apparatus 610 of FIG. 1, FIG. 2, and/or FIG. 6 herein), computer terminals, computer servers, computer systems and/or networks, and/or any combinations thereof (e.g., by one or more multi-threaded and/or multi-core processing units of an AI ergonomic analysis and positioning data processing system). In some embodiments, the method 400 may be embodied in, facilitated by, and/or otherwise associated with various input mechanisms and/or interfaces (such as the interfaces 520a-d, 620 of FIG. 5A, FIG. 5B, FIG. 5C, and FIG. 5D and/or FIG. 6 herein).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 140, 240, 640, 740a-e of FIG. 1, FIG. 2, FIG. 6, FIG. 7A, FIG. 7B, FIG. 7C, FIG. 7D, and/or FIG. 7E herein) may store thereon instructions that when executed by a machine (such as a computerized processor) result in performance according to any one or more of the embodiments described herein.

In some embodiments, the method 400 may comprise acquiring (e.g., by an electronic processing device and/or from a sensor/imaging device) one or more images, at 402. One or more sensors, such as cameras, data transceivers, range finding devices, and/or other imagery and/or data acquisition devices, may, for example, be utilized to capture data descriptive of a location that includes one or more objects, such as features and/or furnishings of a room in a building (e.g., a workspace). In some embodiments, the capturing of the data may occur in response to a request for the data. One or more signals may be transmitted from a user and/or controller device to one or more sensor and/or imaging devices, for example, to initiate and/or conduct data acquisition for one or more desired locations and/or objects. According to some embodiments, whether the data is captured on-demand, in response to a specific request, or as part of an overall data acquisition process, the data may be provided via one or more data storage devices, such as a data/imagery repository. In some embodiments, such data may be made available by one or more third parties that may or may not charge a fee to access the data. According to some embodiments, the data may comprise any quantity, type, and/or configuration of data that is or becomes known or practicable. The data may include, for example, a plurality of data bands, such as different color bands and/or various point data, such as elevations, locations, etc. In some embodiments, the data may comprise various imagery bands, such as visible colors (e.g., RGB), near-IR, IR, and/or point cloud data, such as a Digital Elevation Model (DEM). According to some embodiments, the image/data may comprise a single panoramic image or multiple images, each representing an entire three hundred sixty degree (360°) view of a remote workspace. According to some embodiments, data descriptive of the location/workspace may be acquired from one or more webcams, smart phones, security cameras, and/or other sensor devices disposed to capture data descriptive of the location/workspace. In some embodiments, the captured and/or acquired data may comprise data descriptive of a user/worker in or at the location/workspace. Some of the sensor data may comprise, for example, data descriptive of a posture and/or position of the worker in the workspace and/or may comprise data descriptive of various measurements, sizes, and/or other characteristics of one or more users/workers.

According to some embodiments, the method 400 may comprise identifying (e.g., by the electronic processing device) one or more objects in the image, at 404. According to some embodiments, a plurality of shape files and/or patterns (and/or other shape-indicative and/or pattern-indicative information) may be stored in relation to a plurality of identifiable objects, such as room features, furnishings, electronic devices, humans, and/or other characteristics of a workspace, and one or more of such files/information may be selected based at least in part on a characteristic of the workspace (e.g., the location at which the imagery/data is captured and/or acquired). In some embodiments, for example, it may be determined (e.g., based on geospatial and/or account information) that a particular location/workspace comprises an office building or a home. According to some embodiments, such information may be stored in association with a user/worker account, profile, and/or other identifier and/or retrieved utilizing such an identifier as a data query key. In some embodiments, the shape file may comprise any type, quantity, and/or configuration of shape and/or pattern information that is or becomes practicable, such as, but not limited to, an image file, a template, geospatial vector data, point data, line data, polygon data, coordinate data, and/or other pattern, geometry, color, and/or configuration data. In some embodiments, the shape/pattern file may be defined and/or stored in accordance with one or more data formatting standards, such as the Environmental Systems Research Institute (ESRI) Shapefile Technical Description 3-7855 published July, 1998 by ESRI, Inc. of Redlands, CA. In some embodiments, the shape file may define known and/or estimated extents, colors, patterns, and/or geometries of various objects, such as a chair, desk, conference room table, doorway, computer mouse, keyboard, computer monitor, etc. According to some embodiments, portions of the acquired image(s)/data may be compared to one or more stored shape/pattern files (and/or parameters thereof) to identify likely matches. As different lighting conditions, viewpoints/angles, and/or different camera/sensor configurations may cause a wide variation in image details, it should be understood that an AI-based program conducting image analysis may generally perform mathematical calculations (e.g., regression, best fit, etc.) to identify "matches" that fall within various parameter ranges, but that perfect mathematical "matches" reaching the level of mathematical equivalence are likely to be rare. Accordingly, portions of the image(s) may be compared to stored shapes, colors, textures, patterns, etc., and in the case that the number of similarities falls within a predetermined threshold, a "match" may be established or identified.

In some embodiments, the method 400 may comprise classifying (e.g., by the electronic processing device) the one or more objects, at 406. Any or all objects identified at 404 may, for example, be compared to stored data descriptive of various types, styles, makes, models, etc., of various objects (e.g., consumer products, such as furniture, computers, and/or computer peripherals). According to some embodiments, in the case that a portion of the object(s) is determined to match stored data descriptive of a stored object, corresponding portions of the object may be tagged and/or otherwise identified as a particular type, make, model, etc. In some embodiments, different objects may be identified based on different positioning information derived from the image/data. According to some embodiments, object classification may be at least partially based on data received from one or more of the objects and/or a user/worker. The user/worker may provide information identifying a particular type of chair used in the workspace, for example, and an identified object may be classified as a chair based on specifications for the particular type of chair. In some embodiments, objects may provide an identifier that is utilized to cross-reference stored data to identify the particular type of object. For example, an identifier may be captured and identified via optical character recognition of a machine and/or human-readable tag, label, sticker, and/or other on-object identifier. In the case of electronic objects, the identifier may be transmitted from the object to a sensor and/or analysis system. In either case, the identifier may be utilized to cross-reference stored data to match an identified object to a known object classification (e.g., "chair", and/or "Aeron® Chair by Herman Miller®, available from Herman Miller, Inc. of Zeeland, MI).

According to some embodiments, the method 400 may comprise computing (e.g., by the electronic processing device) object locations, at 408. In the case that the image comprises two-dimensional sensor data, such as a two-dimensional image, relative locations of any or all objects may be estimated based on isometric analysis and/or estimation, e.g., based on image/data parameters, such as parallax, camera/sensor location, lens/sensor configuration data and/or specifications, and/or light/shadow angle analysis. In some embodiments, the image/sensor data may comprise multiple images and/or readings from different angles, orientations, and/or positions, permitting object locations to be derived based on stereoscopic analysis. According to some embodiments, positioning and/or location data may be obtained directly from distance and/or location data, such as LiDAR and/or other ranging data (e.g., a point cloud and/or Digital Elevation Model (DEM)) acquired as part of and/or with the image, and/or from location data received from one or more of the objects and/or the user/worker. The user/worker may provide data defining a location of a keyboard, for example, and/or the user/worker and/or an object itself may provide absolute location information, such as a set of coordinates, GPS data, etc. According to some embodiments, estimated locations may be derived by evaluating the image(s) utilizing a mathematical parallax model to calculate a viewpoint location based on the locations of one or more identified fixed features, such as room corners, in the image(s). The curvature and/or distances between lines and/or artifacts in the image may be utilized as input, in some embodiments, to calculate an estimated distance of the viewpoint to each of the identified objects. In such a manner, for example, relative locations of the objects with respect to the sensor/camera and/or with respect to each other may be computed. In some embodiments, each pixel and/or other identifiable sub-portion or element of the image(s)/data may be assigned a coordinate and/or value, such as a unique and/or sequential identifier. In some embodiments, each pixel or element may be assigned multiple values that together uniquely identify the pixel/element. In the case of a two-dimensional image/data, for example, each pixel/element may be assigned two values, e.g., one for each axis or dimensional direction. According to some embodiments, additional values (e.g., dimensional values) may be assigned, depending upon the content of the underlying and/or original image/sensor data. According to some embodiments, three-dimensional positioning data may be utilized, such as a first value with respect to a first dimension (e.g., an x-axis or horizontal direction), a second value with respect to a second dimension (e.g., a y-axis or vertical direction), and/or a third value with respect to a third dimension (e.g., a z-axis or depth direction; e.g., with respect to a depth datum, such as the calculated/derived sensor/camera position).

In some embodiments, the method 400 may comprise measuring (e.g., by the electronic processing device) at least one distance, at 410. The location or locations computed and/or otherwise determined at 408 may, for example, be utilized to calculate and/or derive estimated distances between one or more objects and one or more other objects, features, and/or locations. An identified object that is classified as a computer monitor located at a particular location in a workspace, for example, may be measured to derive a distance of the display screen above a work surface/desk and/or from the floor. Coordinate and/or point cloud data descriptive of a location of a lower surface of the display screen may be compared (e.g., subtracted and/or otherwise mathematically evaluated), for example, with respect to coordinate and/or point cloud data descriptive of a location of a desk or floor surface, to compute a distance therebetween. In some embodiments, one or more measurements may be provided from one or more of the objects and/or from the user/worker. The user/worker may measure a height of a desk or work surface from the ground/floor, for example, and may provide the measurement data to the sensor/system. According to some embodiments, a sensor in the monitor and/or another sensor of a different object may actively measure a distance and/or setting and provide such measurement/data to the sensor/system. In such manners, for example, a layout of the workspace may be derived, mapped, and/or modeled, e.g., with respect to one or more objects identified therein.

According to some embodiments, the method 400 may comprise identifying (e.g., by the electronic processing device) an improperly positioned object, at 412. One or more of the measurements and/or locations may be evaluated, for example, in accordance with stored rules defining acceptable locations, orientations, settings, and/or positions of particular types (e.g., classifications) of objects to determine whether one or more objects are positioned within acceptable ranges. The rules may be derived from and/or defined by, for example, one or more sets of ergonomic positioning rules, such as the standard CSA Z412 "Office ergonomics: An application standard for workplace ergonomics", $3^{rd}$ Edition, published in 2017 by CSA America, Inc. of Cleveland, OH and/or the standard ISO 9241-1 "Ergonomic Requirements For Office Work With Visual Display Terminals (VDTs)" published in 1997 by the International Organization for Standardization (ISO) of Geneva, Switzerland. In some embodiments, such rules may define ranges of acceptable distances between certain objects, such as a desk top surface, and other objects, such as a floor surface and/or a seat height, and/or based on a workers body dimensions. It may be acceptable in accordance with the rules, for example, for a desk height to be between ten (10) inches (25.4 cm) and fifteen (15) inches (38.1 cm) below a worker's shoulders (e.g., in the case they are seated in front of the desk). In the case that a measurement of such a distance based on the image/data from a sensor in (or proximate to) the workspace is computed to be eight (8) inches (20.32 cm), the particular measurement and/or associated object (or objects) may be flagged as being out of desirable ergonomic bounds. According to some embodiments, an indication of the determination may be stored and/or output.

In some embodiments, the method 400 may comprise identifying (e.g., by the electronic processing device) a target location for the object, at 414. Acceptable distances, measurements, locations, orientations, settings, and/or positions based on the rules may, for example, be utilized to identify one or more locations in the workspace (e.g., coordinate ranges) that satisfy the criteria of the rules. The positioning of a keyboard with respect to a computer monitor may be required to be within a range of thirteen (13) inches (33.02 cm) to twenty-two (22) inches (55.88 cm) in front of the screen, for example, and/or may be required to be centered within five (5) inches (12.7 cm) of the midpoint or center of the screen. Based on a location of the screen (and/or portions thereof) a subset of locations within the workspace that satisfy these criteria may be identified, calculated, and/or defined. In the non-limiting example of the keyboard placement criteria, the acceptable range of locations may comprise a planar surface area on the worker's desk in front of and centered on the screen. In the case of certain objects and criteria, multiple solutions to acceptable positions of objects may exist. An acceptable distance between a user's shoulders and a desk surface (and/or keyboard or mouse) may be adjusted by changing either the users chair height or the user's desk height (e.g., in the case of an adjustable desk, such as a desk that can transform from a first or sitting position to at least a second position, such as a standing position). In such cases, acceptable target locations, positions, and/or settings may comprise a range of locations, positions, and/or settings for each of the desk and the chair. In some embodiments, multiple different criteria may be combined and/or overlap to define one or more target locations, orientations, settings, and/or positions. In the case of the keyboard, for example, the planar surface area defined by the monitor distance or offset rule may be combined with a rule defining a minimum distance between the keyboard and an adjacent computer mouse. Overlapping the criteria may cause a portion of the planar surface area that is too close to the mouse to be discarded, leaving the remainder of the area as a target area defined by an overlap of both rules.

According to some embodiments, the method 400 may comprise outputting (e.g., by the electronic processing device) an indication of the target location, at 416. In some embodiments, such as in the case that manual position correction by the user/worker is desired, the user/worker may be provided with information that facilitates a positioning of one or more objects in their respective target locations (e.g., points, areas/polygons, planes, spheres, and/or other two or three-dimensional shapes/areas/volumes). According to some embodiments, the outputting may comprise outputting one or more of a sound, voice, light, light pattern, text, images, video, Graphical User Interface (GUI) elements, and/or Augmented Reality (AR) elements. The system may project (e.g., utilizing one or more of the sensors and/or other objects or devices in or proximate to the workspace) a light (e.g., a laser) on a surface, such as a desk work surface, for example, that indicates the extents of the target location (e.g., range of applicable real-world coordinates). The system may utilize, for example, an LFC, LF2+, or Project LFX AR projector available from Lightform, Inc. of San Francisco, CA. In some embodiments, a movement prompt may be provided that instructs the user to reposition an object (e.g., the keyboard, a chair) and/or change a setting of an object (e.g., a height setting of a desk or chair, a light setting of a lighting device, and/or a brightness or other setting of a computer monitor).

In some embodiments, the method 400 may comprise tracking (e.g., by the electronic processing device) a movement of the object, at 418. Revised and/or updated sensor data may be utilized, for example, to identify a new/updated location of the object at a point in time after the initial identification/classification. According to some embodiments, movement/repositioning of the object may be monitored based on data received from the object itself and/or a referentially-related object. In the case of the keyboard, for example, the keyboard may comprise an accelerometer and/or other sensor that is capable of tracking and/or reporting movement of the keyboard, and such data may be acquired by the system to discern repositioning of the keyboard. According to some embodiments, a referentially-related object with movement sensing capability may provide data descriptive of the movement of the object. A user may place their smart phone on the keyboard so that the phone moves with the keyboard, for example, effectively tracking the movement of the keyboard. In some embodiments, a computer mouse may be moved with the keyboard to provide similar grouped-object movement data. According to some embodiments, repositioning/movement data may be acquired from a wearable device coupled to the user/worker. In the case that the user/worker wears a smart watch such as Apple® Watch SE™ manufactured by Apple®, Inc. of Cupertino, CA, for example, movement data from the watch acquired during a repositioning of the object may be descriptive of a movement of the user's wrist. In some embodiments, the wrist movement may be translated into and/or approximated as the movement of the keyboard. Movement vector data from the watch may, for example, be mathematically applied to the starting position (e.g., the improper position) of the object to derive coordinates descriptive of a repositioned location of the object.

According to some embodiments, the method 400 may comprise identifying (e.g., by the electronic processing device) a positioning of the object in the target location, at 420. The tracked and/or monitored movements and/or resulting locations of the object may be compared to the target location (e.g., point, line, area, and/or volume), for example, to determine that the object has been repositioned to coincide with the target position (and/or ranges and/or thresholds thereof). In some embodiments, the outputting of the indication of the target location at 416 and the tracking of the movement of the object at 418 may be repeated until the object arrives at the target location. Such a feedback loop may be employed, for example, to guide the movement (e.g., by a user/worker) toward the appropriate/desired/target location (and/or orientation, setting, etc.). According to some embodiments, such as in the case that the system automatically effectuates the movement of the object (e.g., by controlling one or more motors, actuators, switches, relays, etc.), a series or listing of commands (e.g., a table, matrix, etc.) may be utilized to compute a resulting location of the object, which may be compared to the target location to identify any overlap therewith. In some embodiments, the commands may be specifically chosen and/or structured to cause the object to arrive at the target location, orientation, and/or setting.

In some embodiments, the method 400 may comprise outputting (e.g., by the electronic processing device) an indication of the proper positioning of the object, at 422. In some embodiments, such as in the case that manual position correction by the user/worker is utilized, the user/worker may be provided with information that informs the user/worker that the one or more objects have been successfully repositioned (reoriented, reset, etc.) to their respective target locations (e.g., points, areas/polygons, planes, spheres, and/or other two or three-dimensional shapes/areas/volumes), orientations, settings, etc. According to some embodiments, the outputting may comprise outputting one or more of a sound, voice, light, light pattern, text, images, video, GUI elements, and/or AR elements. The system may, for example, indicate the target location to the user via an AR element on the user's smart phone display and the AR element may be dynamically changed or updated to reflect proper positioning in the case that the tracked object(s) is moved to the target location. In the case that a referentially-related object is utilized for the repositioning tracking, the referentially-related object may be activated to output a sound, light (e.g., of a specific color), vibrate, etc., in the case that the proper positioning is detected. In the case of a wearable device, such as a smart watch, for example, the user may raise their computer monitor height, adjust the height of their chair, and/or reposition their posture, and when the desired result has been achieved, the smart watch may be activated by the system to vibrate and/or otherwise provide output indicating the proper positioning. In some embodiments, output may be utilized in advance of the proper position being achieved, such as a red light output (e.g., via a mouse, watch, phone, keyboard, etc.; e.g., whether such devices are the object being moved or otherwise) indicating that the object is in a first distance range from the target position, a yellow light output indicating that the object is in a second distance range from the target position (e.g., closer than the first distance range), and/or a green light output indicating that the object is in a third distance range, such as an acceptable target range, from the target position.

IV. AI Ergonomic Analysis and Positioning Interfaces

Referring now to FIG. 5A, FIG. 5B, FIG. 5C, and FIG. 5D, diagrams of a system 500 comprising a user device 502 providing example interfaces 520a-d according to some embodiments are shown. In some embodiments, the interfaces 520a-d may comprise one or more web pages, web forms, database entry forms, API elements and/or instances, spreadsheets, tables, and/or applications or other GUI objects by which a user or other entity may enter data (e.g., provide or define input) to enable and/or trigger AI-based ergonomic analysis and/or positioning, as described herein. The interfaces 520a-d may, for example, comprise a front-end of an AI ergonomic analysis and/or positioning application program and/or platform programmed and/or otherwise configured to execute, conduct, and/or facilitate the method 400 of FIG. 4 herein, and/or portions thereof. In some embodiments, the interfaces 520a-d may be output via a computerized device, such as the user device 502, which may, for example, be similar in configuration to one or more of the user/sensor devices 102, 202a-b, the controller device/server 110, 210, and/or the apparatus 610 of FIG. 1, FIG. 2, and/or FIG. 6 herein.

Figure 5A:
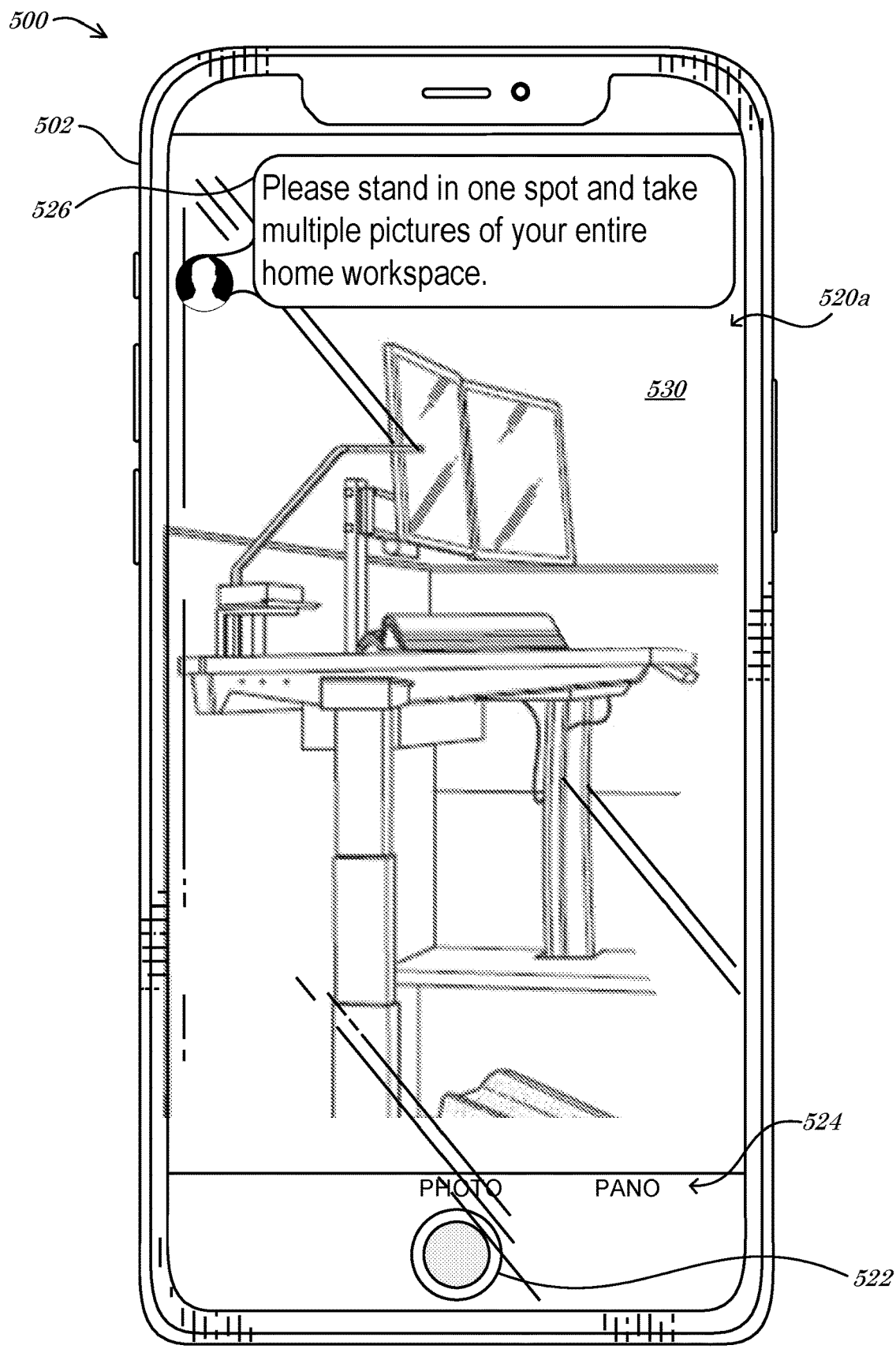
FIG. 5A, FIG. 5B, FIG. 5C, and FIG. 5D are diagrams of a system providing example interfaces according to some embodiments.

According to some embodiments, the interfaces 520a-d may comprise one or more tabs and/or other segmented and/or logically-presented data forms and/or fields. In some embodiments, the interfaces 520a-d may be configured and/or organized to allow and/or facilitate entry and/or acquisition of information descriptive of a location for which ergonomic analysis and/or positioning is desired (e.g., via an AI ergonomic analysis and/or positioning application). According to some embodiments, a first version (or page or instance) of the interface 520a (e.g., defining a first input and/or output mechanism) as depicted in FIG. 5A may comprise a data acquisition interface that provides an image (and/or video and/or other data) capture button 522, an image type selection menu 524, and/or an AI chat and/or instruction prompt 526. The prompt 526 may, as depicted, for example, provide instructions to a user (not shown) of the user device regarding how to capture, measure, and/or otherwise acquire desired data. According to some embodiments, the first version of the interface 520a may comprise a camera interface that permits (and/or instructs) the user to capture an image 530 of the users (and/or another user's) workspace.

Figure 5B:
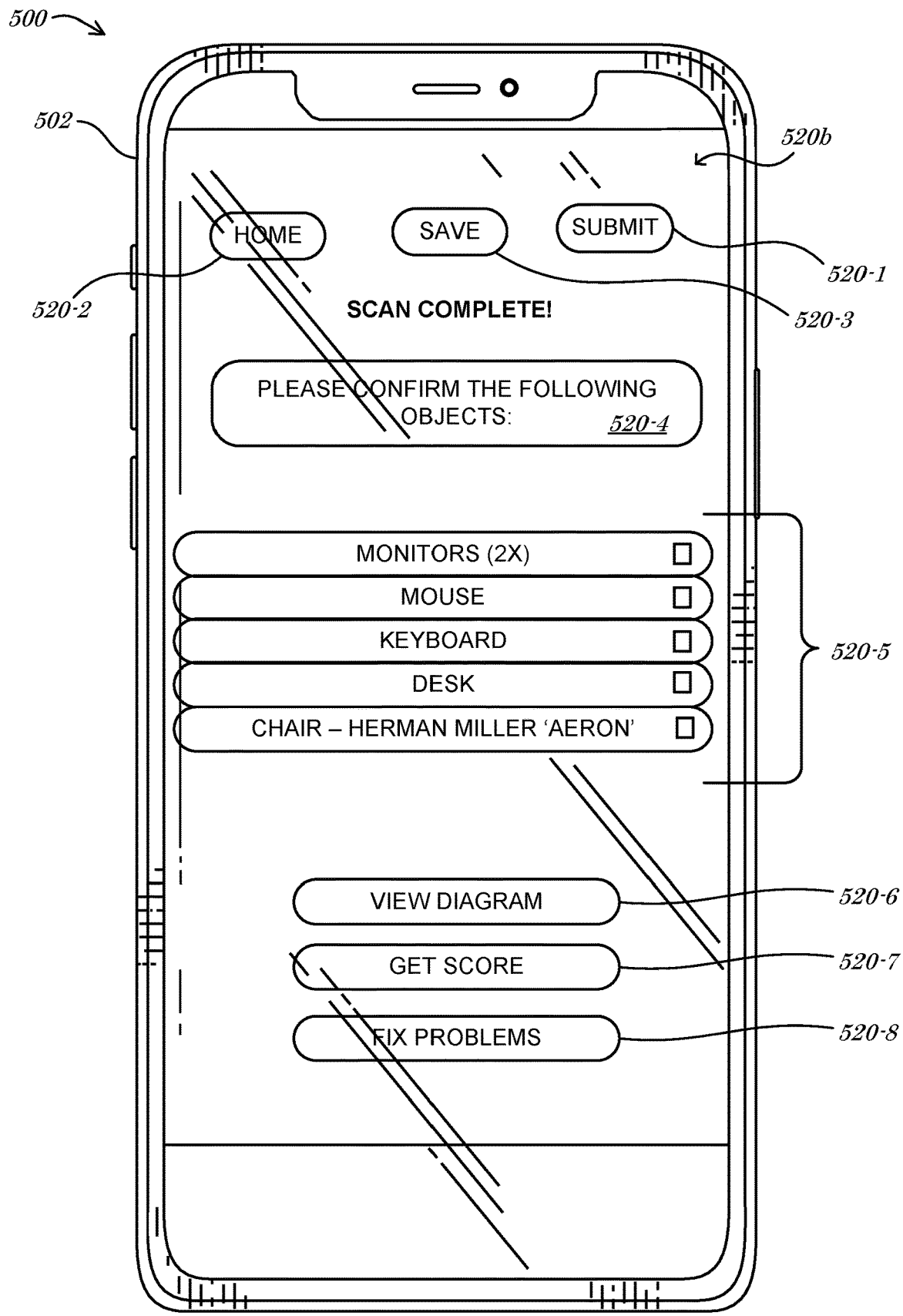

In some embodiments, a second version (or page or instance) of the interface 520b (e.g., defining a second input and/or output mechanism) as depicted in FIG. 5B may comprise a data verification and/or editing interface that provides one or more data input and/or output mechanisms, tools, objects, and/or features, such as a submit button 520-1, a home button 520-2, a save button 520-3, an instruction window 520-4, a listing 520-5 of one or more objects that have been identified and/or classified (e.g., based on an AI analysis of the image 530), a view diagram button 520-6, a get score button 520-7, and/or a fix problems button 520-8. In some embodiments, the second version of the interface 520b may be generated in response to an AI analysis of the image 530. In some embodiments, various objects may be automatically identified and/or classified and may be presented to the user via the listing 520-5. According to some embodiments, the user may be prompted to enter and/or confirm information descriptive of the objects (e.g., the listing 520-5). Image analysis may compare textures, lines, patterns, and/or features of the objects to stored textures, lines, patterns, and/or features, for example, to identify and/or classify the objects, and the user may confirm, delete, and/or edit the AI-generated listing 520-5. According to some embodiments, the user may activate the get score button 520-7 to obtain an ergonomic assessment result (score, rank, quantitative, and/or qualitative determination or assessment) and/or may activate the fix problems button 520-8 to access instructions for correcting any identified problems. In some embodiments, the user may activate the view diagram button 520-6 to generate and/or access an AI-generated diagram of the user's workspace, such as may be provided by a third version (or page or instance) of the interface 520c (e.g., defining a third input and/or output mechanism) as depicted in FIG. 5C.

According to some embodiments, the third version of the interface 520c may provide an automatically generated diagram of the workspace that may include various GUI elements descriptive of the workspace and/or of the analysis of the workspace. As depicted in FIG. 5C, for example, the third version of the interface 520c may comprise a desk object 506-1, a first monitor object 506-3a, a second monitor object 506-3b, a keyboard object 506-4, a mouse object 506-8a, a mouse pad object 506-8b, and/or a worker object 506-11. In some embodiments, the various objects 506-1, 506-3a, 506-3b, 506-4, 506-8a, 506-8b, 506-11 may be generated in a scaled manner that corresponds to assigned coordinates and/or real-world locations of the various objects 506-1, 506-3a, 506-3b, 506-4, 506-8a, 506-8b, 506-11 with respect to each other and/or may be provided in an AR manner based on imaging input provided by the user device 502. The user may hold the user device 502 above the workspace to capture and/or show the diagram in the third version of the interface 520c, for example, or the diagram may be generated and depicted regardless of the current input being received from the user device 502.

According to some embodiments, the third version of the interface 520c may provide indications of various user ranges 528 and/or may designate a target location 532. The user ranges 528 may, for example, comprise and/or describe various ergonomic attributes that have been considered in the analysis of the workspace. In some embodiments, the user ranges 528 may comprise, but are not limited to, a FoV of the user, a range of motion of an arm of the user (e.g., as measured from the shoulder), and/or various ranges of acceptable motion for the user's hands, wrists, etc. In some embodiments, the target location 532 may comprise and/or define a point, line, area, and/or volume (and area as depicted in FIG. 5C) in which acceptable positioning of an object has been calculated (e.g., by the AI system and based on the image 530). For example, various images (e.g., the image 530), data, measurements, and/or other data captured, calculated, and/or computed by the user device 502 (and/or other devices; not shown) may be utilized (e.g., by an AI ergonomic analysis and/or positioning program) to assess the location (e.g., the workspace). The derived dimensions of the workspace, room, layout of the workspace, identified contents of the workspace, positions of contents within the workspace, features of the workspace, and/or distances between features, contents, objects, etc., may be compared, in some embodiments, to one or more stored rules to determine whether the one or more rules are met or satisfied. In the case that the keyboard 506-4 is identified at the location as depicted in the diagram in FIG. 5C, for example, a rule for keyboards may either be satisfied or violated (e.g., such as in the case that the keyboard is positioned too close to the first monitor 506-3a). According to some embodiments, a rule may define a criteria that any keyboard must be positioned at a minimum distance away from any monitor and/or that the keyboard 506-4 must be located within a certain range of reach and/or motion of the user. In the example depicted in FIG. 5C, as the target location 532 may be defined by application of any or all rules and the keyboard 506-4 is not located within the target location 532, a rule may be determined not to be satisfied or met. According to some embodiments, the resolution of such rules may define one or more assessment parameters, such as ranks, scores, and/or other values. In some embodiments, an evaluation of a rule that results in a negative outcome or determination may be resolved by the system automatically repositioning one or more objects and/or by the system guiding the user through the repositioning process.

Figure 5C:
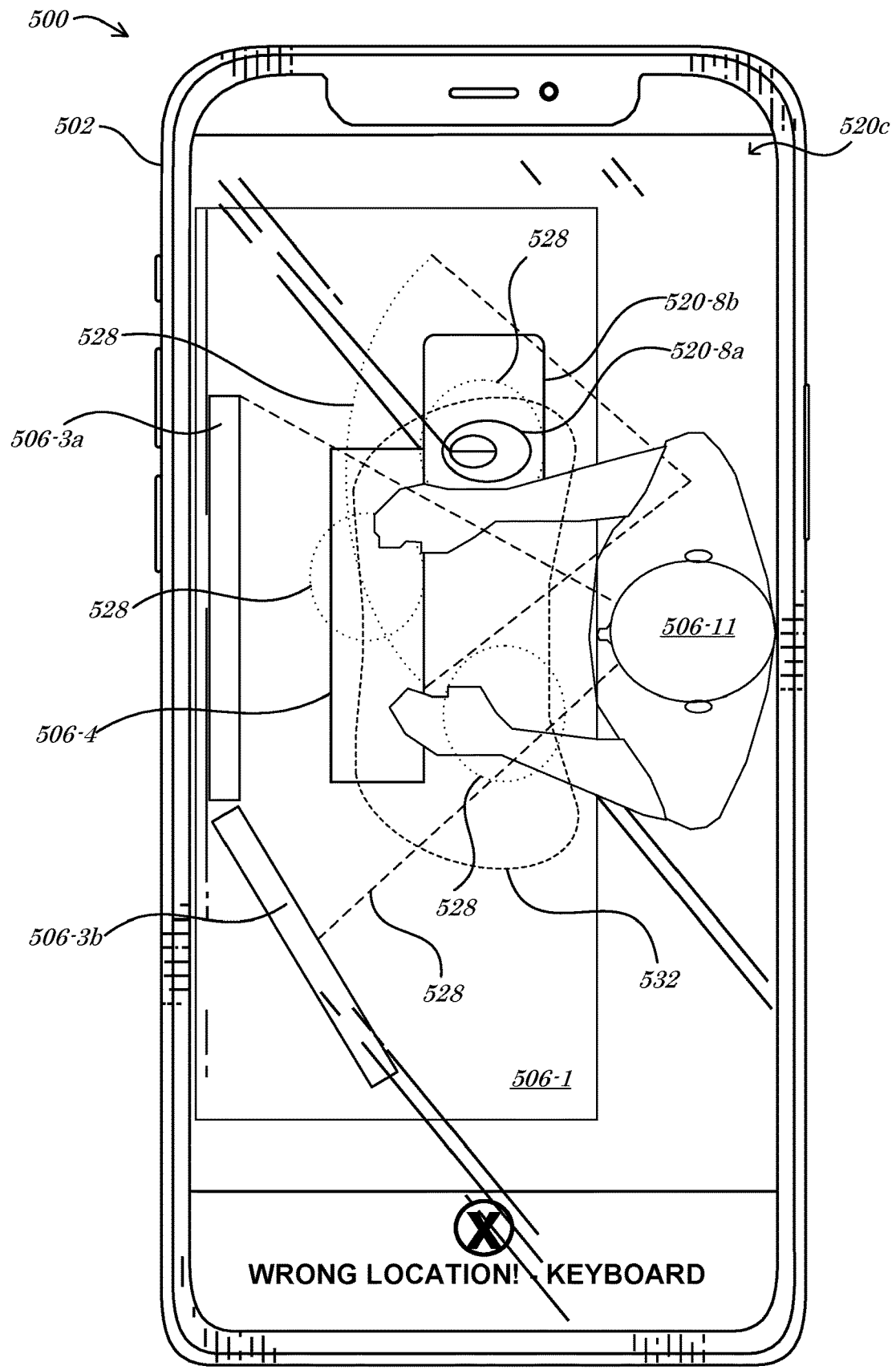
Figure 5D:
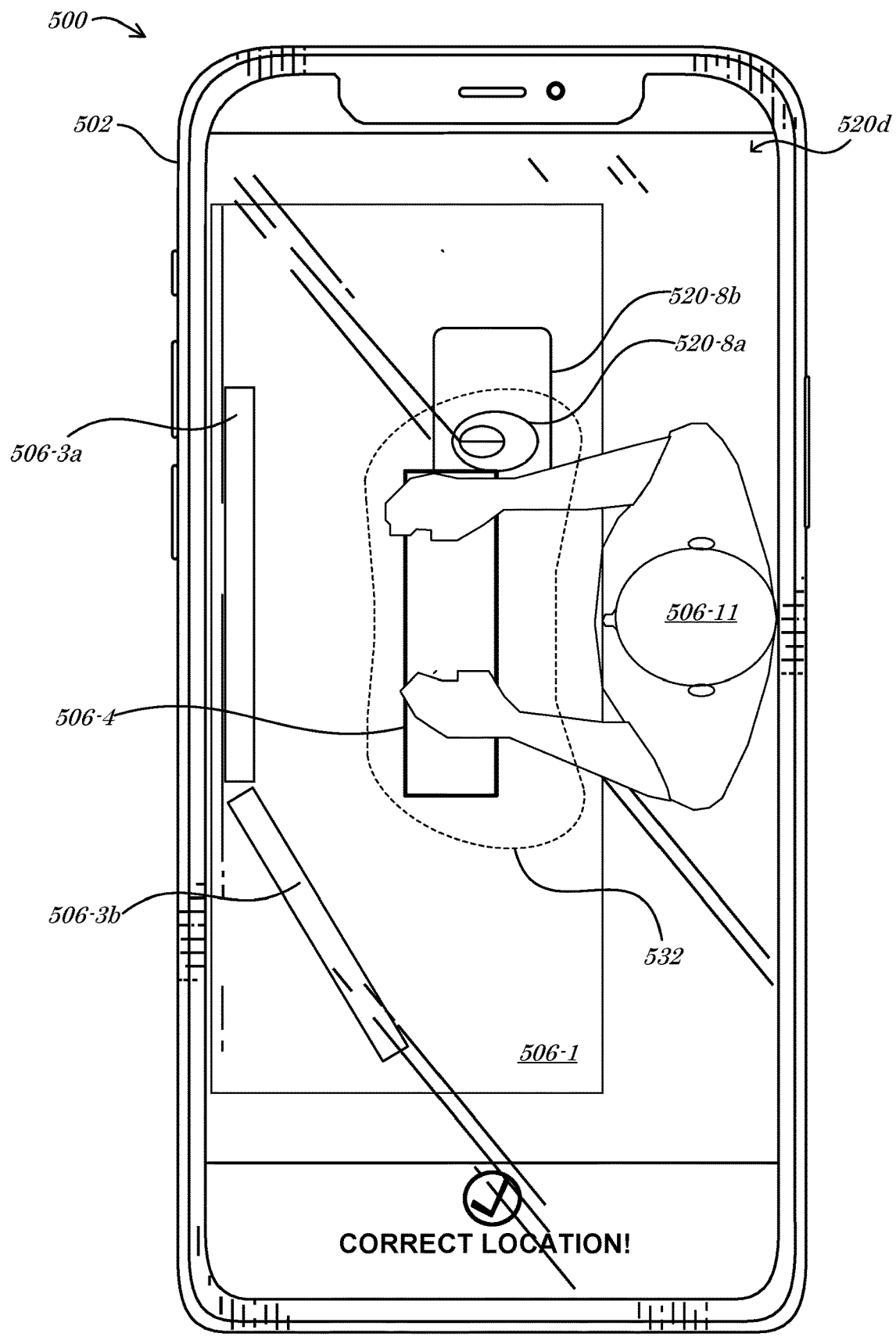

While the user may be presented with the third version of the interface 520c that provides the message "Wrong Location!—Keyboard" to the user and identifies the target location 532 as depicted in FIG. 5C, for example, the user (and/or the system) may initiate movement (e.g., repositioning) of the keyboard 506-4. The user may slide the keyboard 506-4 along the desk object 506-1 toward the worker object 506-11 (which may or may not coincide with a location of the actual user), for example, and the system may monitor the movement with respect to the computed and displayed target location 532. As depicted in FIG. 5D, a fourth version (or page or instance) of the interface 520d (e.g., defining a fourth input and/or output mechanism) may show the updated location of the keyboard 506-4. In the example depicted in FIG. 5D, the fourth version of the interface 520d may highlight the keyboard 506-4 (e.g., a GUI and/or AR object or element descriptive thereof) and/or may provide the message "Correct Location!" to the user in the case that the current location of the keyboard 506-4 falls within and/or overlaps with (e.g., greater than a threshold percentage of overlap) target location 532. In such a manner, for example, various objects within the user's workspace may be automatically moved (e.g., in the case that they are self-mobile and capable of being controlled by the system) and/or guided to locations, positions, orientations, and/or settings that comply with various ergonomic assessment rules. At-home and/or remote workers may accordingly be prompted and automatically guided by the AI system to correct issues with their home/remote workspaces.

Fewer or more components 502, 506-1, 506-3a, 506-3b, 506-4, 506-8a, 506-8b, 506-11, 520a-d, 528, 532 and/or various configurations of the depicted components 502, 506-1, 506-3a, 506-3b, 506-4, 506-8a, 506-8b, 506-11, 520a-d, 528, 532 may be included in the system 500 without deviating from the scope of embodiments described herein. In some embodiments, the components 502, 506-1, 506-3a, 506-3b, 506-4, 506-8a, 506-8b, 506-11, 520a-d, 528, 532 may be similar in configuration and/or functionality to similarly named and/or numbered components as described herein. In some embodiments, the system 500 (and/or portions thereof) may comprise an automatic AI ergonomic analysis and/or positioning program, system, and/or platform programmed and/or otherwise configured to execute, conduct, and/or facilitate the method 400 of FIG. 4 herein, and/or portions thereof.

While various components of the interfaces 520a-d have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

V. AI Ergonomic Analysis and Positioning Apparatus and Articles of Manufacture

Figure 6:
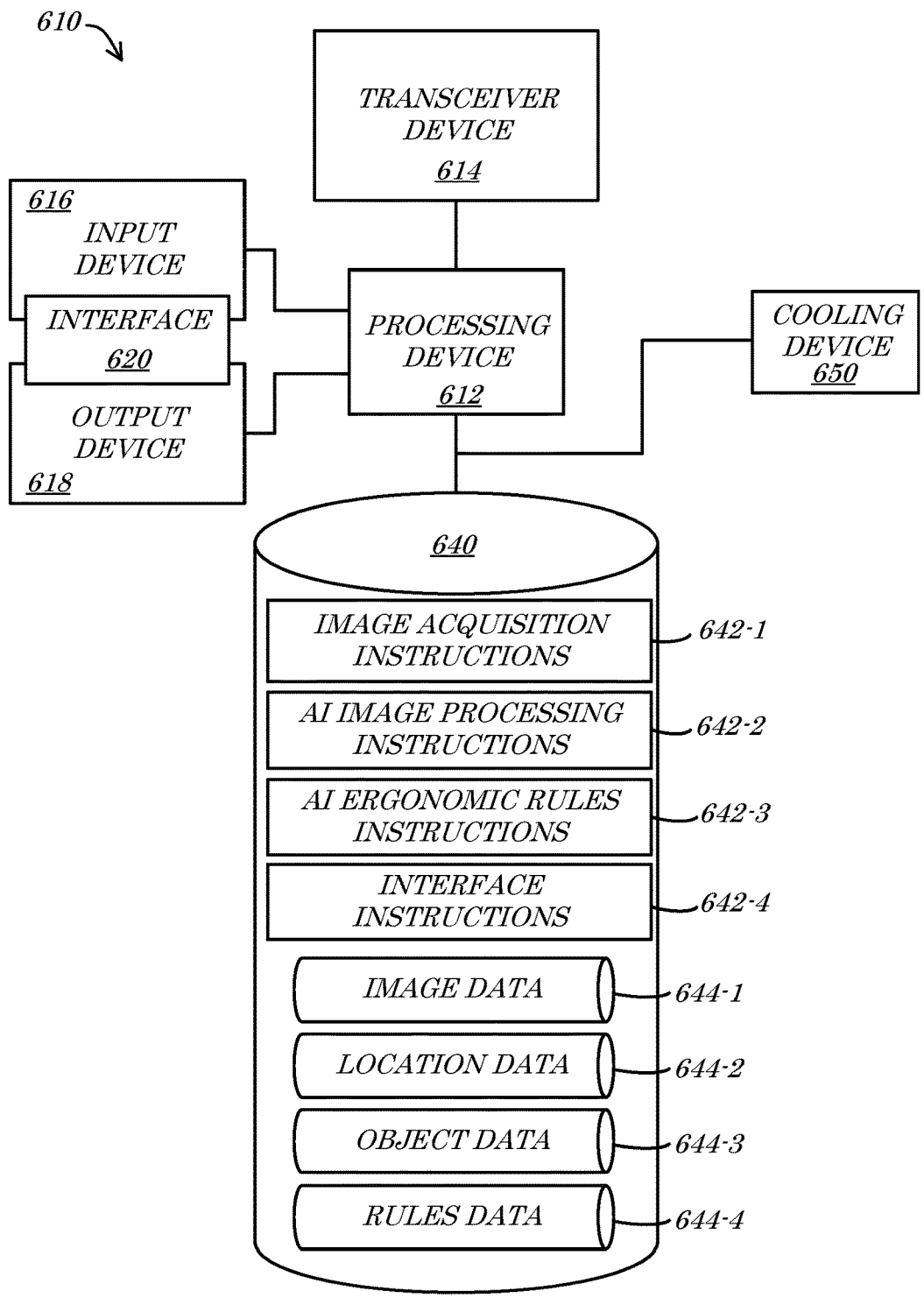
FIG. 6 is a block diagram of an apparatus according to some embodiments.
Figure 7A:
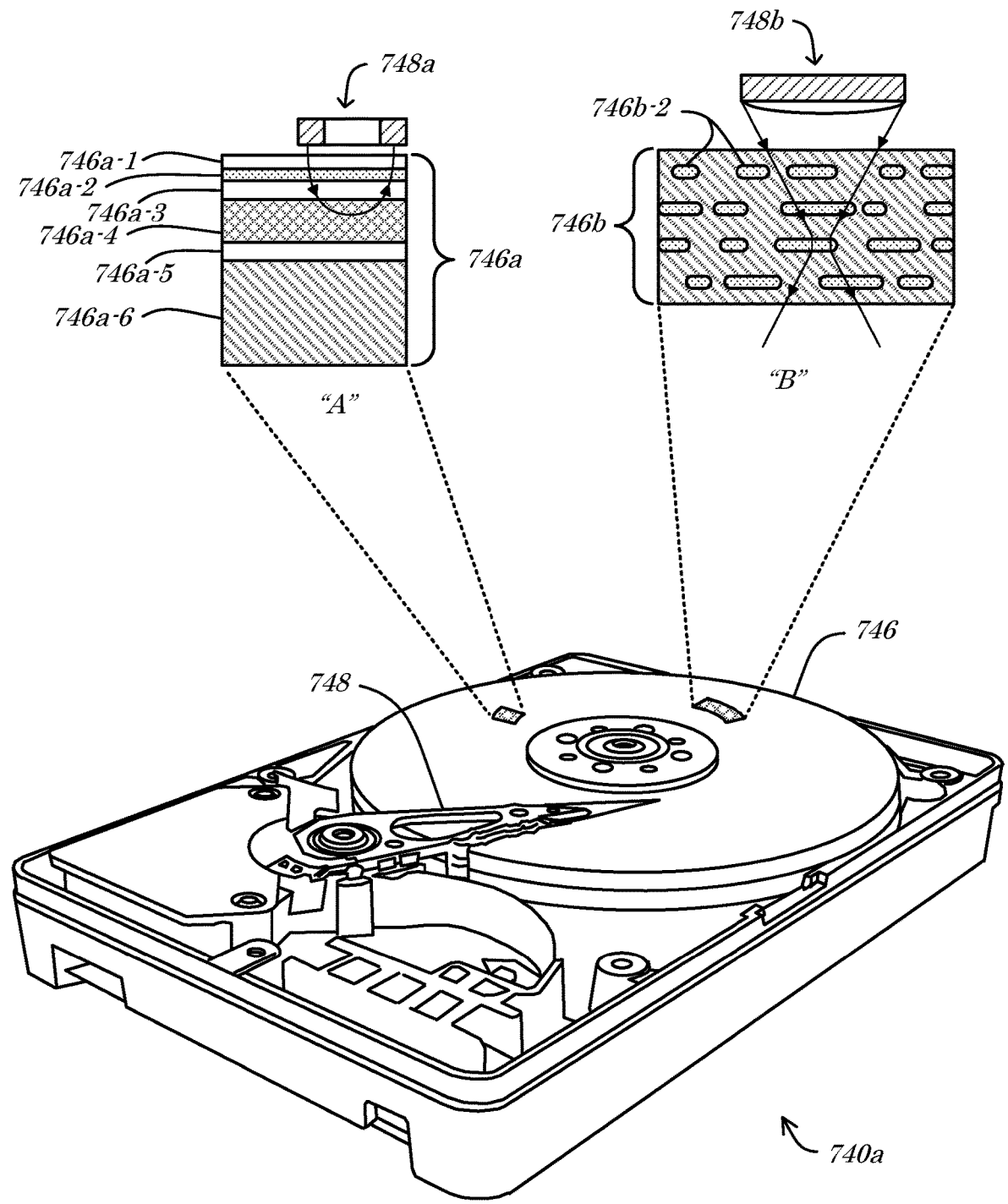
FIG. 7A, FIG. 7B, FIG. 7C, FIG. 7D, and FIG. 7E are perspective diagrams of exemplary data storage devices according to some embodiments.
Figure 7B:
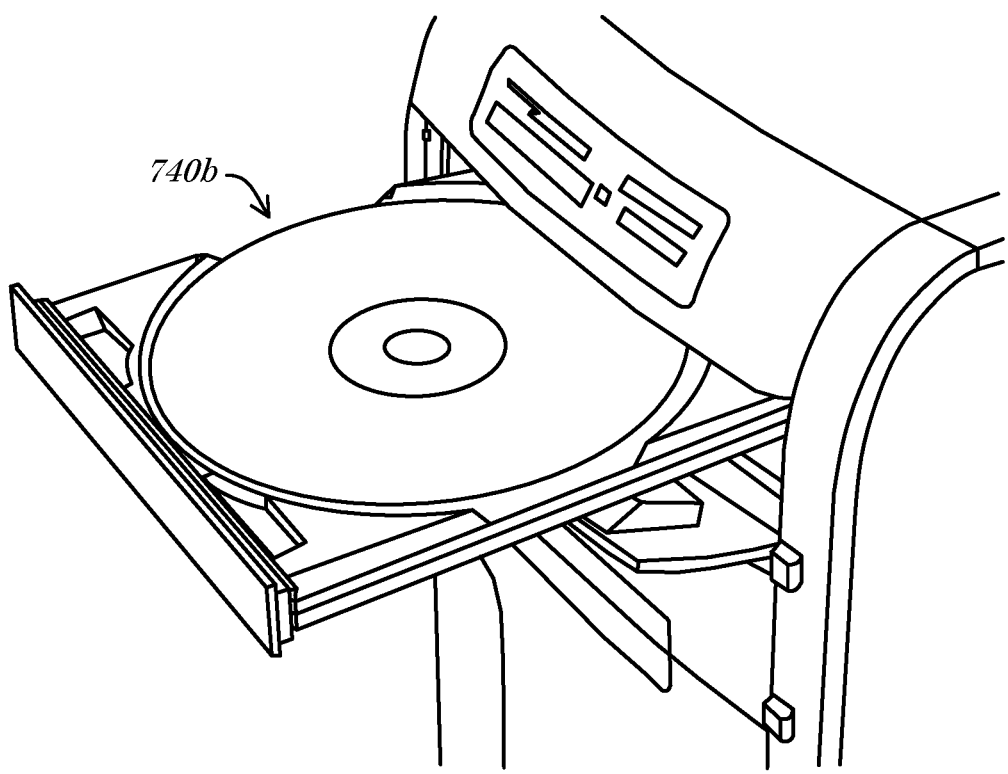
Figure 7C:
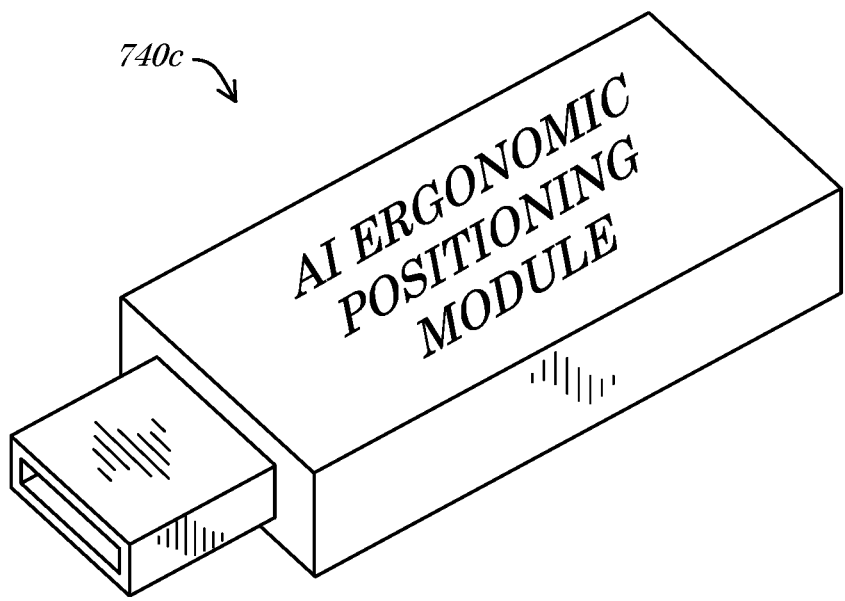
Figure 7D:
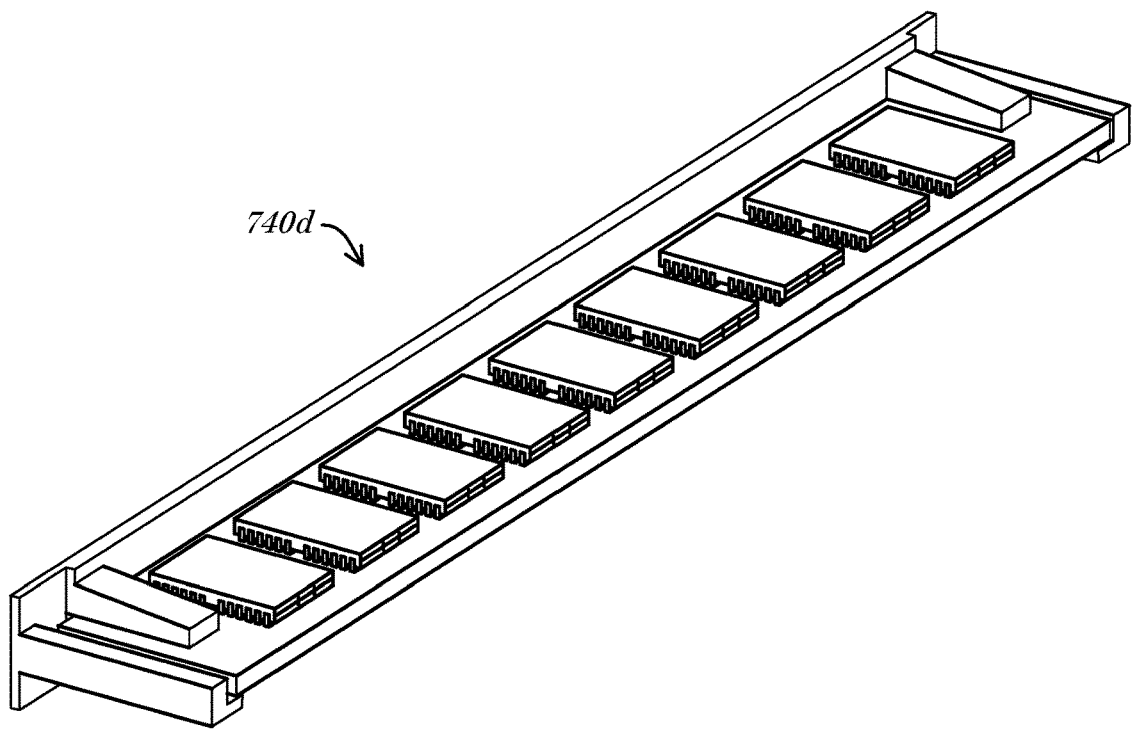
Figure 7E:
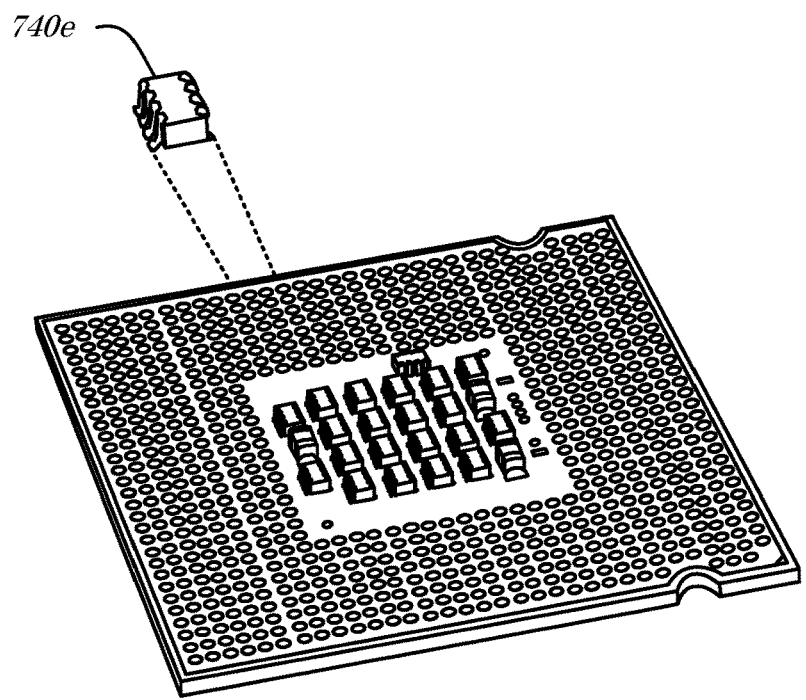

Turning to FIG. 6, a block diagram of an AI device or other apparatus 610 according to some embodiments is shown. In some embodiments, the apparatus 610 may be similar in configuration and/or functionality to one or more of the user/sensor devices 102, 202a-b, 502, and/or the controller device/server 110, 210 of FIG. 1, FIG. 2, FIG. 5A, FIG. 5B, FIG. 5C, and/or FIG. 5D herein. The apparatus 610 may, for example, execute, process, facilitate, and/or otherwise be associated with the method 400 of FIG. 4 herein, and/or portions thereof. In some embodiments, the apparatus 610 may comprise a processing device 612, a transceiver device 614, an input device 616, an output device 618, an interface 620, a memory device 640 (storing various programs and/or instructions 642 and data 644), and/or a cooling device 650. According to some embodiments, any or all of the components 612, 614, 616, 618, 620, 640, 642, 644, 650 of the apparatus 610 may be similar in configuration and/or functionality to any similarly named and/or numbered components described herein. Fewer or more components 612, 614, 616, 618, 620, 640, 642, 644, 650 and/or various configurations of the components 612, 614, 616, 618, 620, 640, 642, 644, 650 be included in the apparatus 610 without deviating from the scope of embodiments described herein.

According to some embodiments, the processor 612 may be or include any type, quantity, and/or configuration of processor that is or becomes known. The processor 612 may comprise, for example, an Intel® IXP 2800 network processor or an Intel® XEON™ Processor coupled with an Intel® E6501 chipset. In some embodiments, the processor 612 may comprise multiple interconnected processors, microprocessors, and/or micro-engines. According to some embodiments, the processor 612 (and/or the apparatus 610 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 610 comprises a server, such as a blade server, necessary power may be supplied via a standard AC outlet, power strip, surge protector, and/or Uninterruptible Power Supply (UPS) device.

In some embodiments, the transceiver device 614 may comprise any type or configuration of communication device that is or becomes known or practicable. The transceiver device 614 may, for example, comprise a Network Interface Card (NIC), a telephonic device, a cellular network device, a router, a hub, a modem, and/or a communications port or cable. According to some embodiments, the transceiver device 614 may also or alternatively be coupled to the processor 612. In some embodiments, the transceiver device 614 may comprise an IR, RF, Bluetooth™, Near-Field Communication (NFC), and/or Wi-Fi® network device coupled to facilitate communications between the processor 612 and another device (not shown).

According to some embodiments, the input device 616 and/or the output device 618 may be communicatively coupled to the processor 612 (e.g., via wired and/or wireless connections and/or pathways) and they may generally comprise any types or configurations of input and output components and/or devices that are or become known, respectively. The input device 616 may comprise, for example, a keyboard that allows an operator of the apparatus 610 to interface with the apparatus 610 (e.g., a user, such as to initiate and/or review AI-based ergonomic analysis and/or positioning activities, as described herein) and/or may comprise one or more workspace objects having input capabilities (e.g., a mouse device, keyboard, wearable device, etc.). The output device 618 may, according to some embodiments, comprise a display screen and/or other practicable output component and/or device, such as one or more workspace objects having output capabilities (e.g., a mouse device, keyboard, wearable device, etc.). The output device 618 may, for example, provide an interface (such as the interface 620) via which AI ergonomic analysis, positioning, assessment, and/or other data or information is provided to a user (e.g., via a website and/or mobile application). According to some embodiments, the input device 616 and/or the output device 618 may comprise and/or be embodied in a single device, such as a touch-screen monitor or display.

The memory device 640 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of image acquisition instructions 642-1, AI image processing instructions 642-2, AI ergonomic rules instructions 642-3, and/or interface instructions 642-4, image data 644-1, location data 644-2, object data 644-3, and/or rules data 644-4. In some embodiments, the image acquisition instructions 642-1, AI image processing instructions 642-2, AI ergonomic rules instructions 642-3, interface instructions 642-4, image data 644-1, location data 644-2, object data 644-3, and/or rules data 644-4 may be utilized by the processor 612 to provide output information via the output device 618 and/or the transceiver device 614.

According to some embodiments, the image acquisition instructions 642-1 may be operable to cause the processor 612 to process image data 644-1, location data 644-2, object data 644-3, and/or rules data 644-4 in accordance with embodiments as described herein. Image data 644-1, location data 644-2, object data 644-3, and/or rules data 644-4 received via the input device 616 and/or the transceiver device 614 may, for example, be analyzed, sorted, filtered, decoded, decompressed, ranked, scored, plotted, and/or otherwise processed by the processor 612 in accordance with the image acquisition instructions 642-1. In some embodiments, image data 644-1, location data 644-2, object data 644-3, and/or rules data 644-4 may be fed by the processor 612 through one or more mathematical and/or statistical formulas and/or models in accordance with the image acquisition instructions 642-1 to acquire and/or direct the acquisition of one or more images and/or other sensor data descriptive of a remote workspace, as described herein.

In some embodiments, the AI image processing instructions 642-2 may be operable to cause the processor 612 to process image data 644-1, location data 644-2, object data 644-3, and/or rules data 644-4 in accordance with embodiments as described herein. Image data 644-1, location data 644-2, object data 644-3, and/or rules data 644-4 received via the input device 616 and/or the transceiver device 614 may, for example, be analyzed, sorted, filtered, decoded, decompressed, ranked, scored, plotted, and/or otherwise processed by the processor 612 in accordance with the AI image processing instructions 642-2. In some embodiments, image data 644-1, location data 644-2, object data 644-3, and/or rules data 644-4 may be fed by the processor 612 through one or more mathematical and/or statistical formulas and/or models in accordance with the AI image processing instructions 642-2 to process received images/data by identifying objects, features and/or characteristics of the location as represented in the images/data, as described herein.

According to some embodiments, the AI ergonomic rules instructions 642-3 may be operable to cause the processor 612 to process image data 644-1, location data 644-2, object data 644-3, and/or rules data 644-4 in accordance with embodiments as described herein. Image data 644-1, location data 644-2, object data 644-3, and/or rules data 644-4 received via the input device 616 and/or the transceiver device 614 may, for example, be analyzed, sorted, filtered, decoded, decompressed, ranked, scored, plotted, and/or otherwise processed by the processor 612 in accordance with the AI ergonomic rules instructions 642-3. In some embodiments, image data 644-1, location data 644-2, object data 644-3, and/or rules data 644-4 may be fed by the processor 612 through one or more mathematical and/or statistical formulas and/or models in accordance with the AI ergonomic rules instructions 642-3 to conduct an AI-based analysis and/or positioning (utilizing one or more AI programs and/or rule sets) of a workspace by scoring, ranking, and/or assessing objects and/or their locations, orientations, and/or settings, as described herein.

In some embodiments, the interface instructions 642-4 may be operable to cause the processor 612 to process image data 644-1, location data 644-2, object data 644-3, and/or rules data 644-4 in accordance with embodiments as described herein. Image data 644-1, location data 644-2, object data 644-3, and/or rules data 644-4 received via the input device 616 and/or the transceiver device 614 may, for example, be analyzed, sorted, filtered, decoded, decompressed, ranked, scored, plotted, and/or otherwise processed by the processor 612 in accordance with the interface instructions 642-4. In some embodiments, image data 644-1, location data 644-2, object data 644-3, and/or rules data 644-4 may be fed by the processor 612 through one or more mathematical and/or statistical formulas and/or models in accordance with the interface instructions 642-4 to provide various interfaces to end-users, consumers, companies, and/or other users to facilitate AI-based ergonomic analysis and automatically effectuate and/or drive workspace object repositioning, as described herein.

According to some embodiments, the apparatus 610 may comprise the cooling device 650. According to some embodiments, the cooling device 650 may be coupled (physically, thermally, and/or electrically) to the processor 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 610.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640)

may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated).

Referring now to FIG. 7A, FIG. 7B, FIG. 7C, FIG. 7D, and FIG. 7E, perspective diagrams of exemplary data storage devices 740a-e according to some embodiments are shown. The data storage devices 740a-e may, for example, be utilized to store instructions and/or data, such as image acquisition instructions 642-1, AI image processing instructions 642-2, AI ergonomic rules instructions 642-3, interface instructions 642-4, image data 644-1, location data 644-2, object data 644-3, and/or rules data 644-4, each of which is presented in reference to FIG. 6 herein. In some embodiments, instructions stored on the data storage devices 740a-e may, when executed by a processor, cause the implementation of and/or facilitate the method 400 of FIG. 4 herein, and/or portions thereof.

According to some embodiments, the first data storage device 740a may comprise one or more various types of internal and/or external hard drives. The first data storage device 740a may, for example, comprise a data storage medium 746 that is read, interrogated, and/or otherwise communicatively coupled to and/or via a disk reading device 748. In some embodiments, the first data storage device 740a and/or the data storage medium 746 may be configured to store information utilizing one or more magnetic, inductive, and/or optical means (e.g., magnetic, inductive, and/or optical-encoding). The data storage medium 746, depicted as a first data storage medium 746a for example (e.g., breakout cross-section "A"), may comprise one or more of a polymer layer 746a-1, a magnetic data storage layer 746a-2, a non-magnetic layer 746a-3, a magnetic base layer 746a-4, a contact layer 746a-5, and/or a substrate layer 746a-6. According to some embodiments, a magnetic read head 748a may be coupled and/or disposed to read data from the magnetic data storage layer 746a-2.

In some embodiments, the data storage medium 746, depicted as a second data storage medium 746b for example (e.g., breakout cross-section "B"), may comprise a plurality of data points 746b-2 disposed with the second data storage medium 746b. The data points 746b-2 may, in some embodiments, be read and/or otherwise interfaced with via a laser-enabled read head 748b disposed and/or coupled to direct a laser beam through the second data storage medium 746b.

In some embodiments, the second data storage device 740b may comprise a CD, CD-ROM, DVD, Blu-Ray™ Disc, and/or other type of optically-encoded disk and/or other storage medium that is or becomes known or practicable. In some embodiments, the third data storage device 740c may comprise a USB keyfob, dongle, and/or other type of flash memory data storage device that is or becomes known or practicable. In some embodiments, the fourth data storage device 740d may comprise RAM of any type, quantity, and/or configuration that is or becomes practicable and/or desirable. In some embodiments, the fourth data storage device 740d may comprise an off-chip cache, such as a Level 2 (L2) cache memory device. According to some embodiments, the fifth data storage device 740e may comprise an on-chip memory device, such as a Level 1 (L1) cache memory device.

The data storage devices 740a-e may generally store program instructions, code, and/or modules that, when executed by a processing device cause a particular machine to function in accordance with one or more embodiments described herein. The data storage devices 740a-e depicted in FIG. 7A, FIG. 7B, FIG. 7C, FIG. 7D, and FIG. 7E are representative of a class and/or subset of computer-readable media that are defined herein as "computer-readable memory" (e.g., non-transitory memory devices as opposed to transmission devices or media).

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like. The term "computing" as utilized herein may generally refer to any number, sequence, and/or type of electronic processing activities performed by an electronic device, such as, but not limited to looking up (e.g., accessing a lookup table or array), calculating (e.g., utilizing multiple numeric values in accordance with a mathematic formula), deriving, and/or defining.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium, such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A method for Artificial Intelligence (AI) ergonomic assessment, comprising:
    receiving, by an electronic processing device, at least one image descriptive of a work area;
    identifying, by the electronic processing device and from the at least one image, a plurality of non-human objects within the work area;
    classifying, by the electronic processing device, each of the identified non-human objects from the plurality of non-human objects;
    computing, by the electronic processing device, an initial location for each of the identified non-human objects from the plurality of non-human objects;
    measuring, by the electronic processing device and based on the initial locations of the identified non-human objects from the plurality of non-human objects, a distance between a first one of the non-human objects and a second one of the non-human objects;
    identifying, by the electronic processing device and based on an analysis of the measured distance by an application of ergonomic distance rules stored in a non-transitory computer readable memory device in communication with the electronic processing device, that the first one of the non-human objects is not properly positioned;
    identifying, by the electronic processing device and based on an application of the stored ergonomic distance rules, a target location for the first one of the non-human objects;
    outputting, by the electronic processing device, an indication of the target location for the first one of the non-human objects;
    tracking, by the electronic processing device, a movement of the first one of the non-human objects from the initial location to a new location;
    identifying, by the electronic processing device and based on a comparison of the target location and the new location for the first one of the non-human objects, that the new location for the first one of the non-human objects falls within the target location; and
    outputting, by the electronic processing device, an indication that the first one of the non-human objects is properly positioned.

2. The AI ergonomic assessment method of claim 1, further comprising:
    identifying, by the electronic processing device and based on the initial locations of the identified non-human objects from the plurality of non-human objects, at least one relative orientation between the identified non-human objects from the plurality of non-human objects;
    computing, by the electronic processing device and based on an analysis of the at least one relative orientation with respect to the stored ergonomic distance rules, an ergonomic assessment score for the work area; and
    outputting, by the electronic processing device, an indication of the ergonomic assessment score for the work area.

3. The AI ergonomic assessment method of claim 2, wherein the computing of the ergonomic assessment score for the work area is further based on the classifications of the plurality of non-human objects within the work area.

4. The AI ergonomic assessment method of claim 1, wherein the non-transitory computer readable memory device further stores (iii) image analysis rules, and wherein the identifying of the plurality of non-human objects within the work area is conducted by an execution of the image analysis rules.

5. The AI ergonomic assessment method of claim 1, wherein the non-transitory computer readable memory device further stores (iv) object classification rules, and wherein the classifying of the identified non-human objects from the plurality of non-human objects is conducted by an execution of the object classification rules.

6. The AI ergonomic assessment method of claim 1, wherein the first one of the non-human objects is classified as one of: a desk, a chair, a computer mouse, a computer monitor, a web camera, and a keyboard.

7. The AI ergonomic assessment method of claim 1, wherein the second one of the non-human objects is classified as a floor surface, and wherein the distance between the first one of the non-human objects and the second one of the non-human objects comprises a height above the floor surface.

8. The AI ergonomic assessment method of claim 1, further comprising:
   outputting, by the electronic processing device, an indication that the first one of the non-human objects is not properly positioned.

9. The AI ergonomic assessment method of claim 1, wherein the stored ergonomic distance rules comprise at least one of: body dimensions of a user and health information of the user.

10. The AI ergonomic assessment method of claim 9, wherein the identifying that the first one of the non-human objects is not properly positioned, comprises:
   computing, by the electronic processing device and based on the stored ergonomic distance rules, a target range of separation distances between the first one of the non-human objects and the second one of the non-human objects; and
   identifying, by the electronic processing device and based on a comparison of the distance between the first one of the non-human objects and the second one of the non-human objects and the target range of separation distances between the first one of the non-human objects and the second one of the non-human objects, that the distance between the first one of the non-human objects and the second one of the non-human objects falls outside of the target range of separation distances between the first one of the non-human objects and the second one of the non-human objects.

11. The AI ergonomic assessment method of claim 1, wherein the target location comprises an area identified by a plurality of points, and wherein the outputting of the indication of the target location for the first one of the non-human objects, comprises:
   identifying, by the electronic processing device a portion of the work area that comprises the plurality of points;
   identifying, by the electronic processing device a portion of the at least one image descriptive of the work area that coincides with the plurality of points; and
   generating an augmented reality overlay superimposed on the portion of the at least one image descriptive of the work area that coincides with the plurality of points.

12. The AI ergonomic assessment method of claim 1, wherein the tracking of the movement of the first one of the non-human objects from the initial location to the new location, comprises:
   receiving, by the electronic processing device, at least one second image descriptive of the work area;
   identifying, by the electronic processing device and from the at least one second image, the first one of the non-human objects; and
   computing, by the electronic processing device and based on the identification of the first one of the non-human objects in the at least one second image, an updated location for the first one of the non-human objects.

13. The AI ergonomic assessment method of claim 1, wherein the tracking of the movement of the first one of the non-human objects from the initial location to the new location, comprises:
   receiving, by the electronic processing device and from the first one of the non-human objects, location information.

14. The AI ergonomic assessment method of claim 1, wherein the at least one image descriptive of the work area is captured at a first time, and wherein the tracking of the movement of the first one of the non-human objects from the initial location to the new location, comprises:
   receiving, by the electronic processing device and from a wearable electronic device coupled to a body part of a user of the work area, at the first time, location information descriptive of a first location of the wearable electronic device; and
   receiving, by the electronic processing device and from the wearable electronic device coupled to the body part of the user of the work area, at a second time, location information descriptive of a second location of the wearable electronic device.

15. The AI ergonomic assessment method of claim 14, wherein the first one of the non-human objects comprises a computer mouse and wherein the wearable electronic device comprises a smart watch coupled to a wrist of the user.

16. The AI ergonomic assessment method of claim 1, wherein the outputting of the indication that the first one of the non-human objects is properly positioned, comprises:
   outputting a sound.

17. The AI ergonomic assessment method of claim 1, wherein the outputting of the indication that the first one of the non-human objects is properly positioned, comprises:
   transmitting, by the electronic processing device and to a wearable electronic device coupled to a body part of a user of the work area, a vibration activation command.

18. The AI ergonomic assessment method of claim 1, wherein the at least one image descriptive of the work area comprises RGB image data.

19. The AI ergonomic assessment method of claim 1, wherein the at least one image descriptive of the work area comprises LiDAR data.

20. The AI ergonomic assessment method of claim 1, further comprising:
   identifying, by the electronic processing device, data descriptive of the work area, wherein the data comprises at least one of a light level of the work area, a brightness of an output device in the work area, and a noise level of the work area;
   computing, by the electronic processing device and based on data descriptive of the work area, an ergonomic assessment score for the work area; and
outputting, by the electronic processing device, an indication of the ergonomic assessment score for the work area.

* * * * *